United States Patent
Roth et al.

(10) Patent No.: US 10,233,850 B2
(45) Date of Patent: Mar. 19, 2019

(54) SUPERVISORY CONTROL OF A COMPRESSION IGNITION ENGINE

(71) Applicant: DELPHI TECHNOLOGIES IP LIMITED, St. Michael (BB)

(72) Inventors: Gregory T. Roth, Davison, MI (US); Gary C. Fulks, Fort Myers, FL (US); Andrew Fedewa, Clarkston, MI (US); Xiaojian Yang, Lake Orion, MI (US); Donald V. Johnson, White Lake, MI (US)

(73) Assignee: DELPHI TECHNOLOGIES IP LIMITED (BB)

( * ) Notice: Subject to any disclaimer, the term of this patent is extended or adjusted under 35 U.S.C. 154(b) by 564 days.

(21) Appl. No.: 14/882,821

(22) Filed: Oct. 14, 2015

(65) Prior Publication Data

US 2017/0107920 A1    Apr. 20, 2017

(51) Int. Cl.
| | |
|---|---|
| F02D 23/00 | (2006.01) |
| F02D 35/02 | (2006.01) |
| F02D 41/00 | (2006.01) |
| F02D 41/30 | (2006.01) |
| F02B 3/10 | (2006.01) |
| F02B 17/00 | (2006.01) |
| F02D 11/10 | (2006.01) |

(52) U.S. Cl.
CPC ............ *F02D 35/02* (2013.01); *F02B 3/10* (2013.01); *F02B 17/005* (2013.01); *F02D 11/105* (2013.01); *F02D 35/023* (2013.01); *F02D 41/0002* (2013.01); *F02D 41/0007* (2013.01); *F02D 41/008* (2013.01); *F02D 41/30* (2013.01); *F02D 2041/3052* (2013.01)

(58) Field of Classification Search
CPC ................................... F02B 3/10; F02D 35/02
See application file for complete search history.

(56) References Cited

U.S. PATENT DOCUMENTS

| | | | |
|---|---|---|---|
| 7,047,741 B2 * | 5/2006 | Gray, Jr. | ................ F01N 3/035 123/301 |
| 8,997,698 B1 * | 4/2015 | Roth | ........................ F01P 3/08 123/41.35 |

(Continued)

FOREIGN PATENT DOCUMENTS

WO    2012/058280 A2    5/2012

OTHER PUBLICATIONS

Sellnau et al., "Development of a Gasoline Direct Injection Compression Ignition (GDCI) Engine", SAE paper No. 2014-01-1300, Apr. 1, 2014.

*Primary Examiner* — Ngoc T Nguyen
(74) *Attorney, Agent, or Firm* — Joshua M. Haines

(57) ABSTRACT

A system for controlling the combustion behavior of an engine is provided. The engine is equipped with a plurality of control subsystems that influence combustion in the engine. The system includes a controller configured to receive a plurality of inputs, to determine a desired subsystem states to operate the engine, and to determine a target value for each of a plurality of control parameters, wherein the target values for one or more control parameters depends on the values of the plurality of inputs. The controller is further configured to communicate the target values of control parameters to the control subsystems.

13 Claims, 10 Drawing Sheets

(56) References Cited

U.S. PATENT DOCUMENTS

| | | | |
|---|---|---|---|
| 2006/0207252 A1* | 9/2006 | Isobe | F02D 23/02 |
| | | | 60/601 |
| 2011/0320104 A1* | 12/2011 | Sellnau | F02D 35/023 |
| | | | 701/103 |
| 2013/0213349 A1 | 8/2013 | Sellnau et al. | |
| 2013/0298554 A1 | 11/2013 | Sellnau | |
| 2015/0114339 A1* | 4/2015 | Sellnau | F02N 19/04 |
| | | | 123/294 |
| 2015/0152817 A1* | 6/2015 | Roth | F02M 31/042 |
| | | | 123/435 |

* cited by examiner

US 10,233,850 B2

SUPERVISORY CONTROL OF A COMPRESSION IGNITION ENGINE

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND OF THE INVENTION

Gasoline Direct-injection Compression-Ignition (GDCI) is an engine combustion process that shows promise in improving engine emissions performance and efficiency. GDCI provides low-temperature combustion of a gasoline-like fuel for high efficiency, low NOx, and low particulate emissions over the complete engine operating range.

Gasoline-like fuels are formulated to resist autoignition, traditionally relying instead on a spark to initiate combustion. The autoignition properties of gasoline-like fuels require relatively precise control of the engine to maintain robust combustion using compression ignition instead of a spark. Improvements in engine control are desired.

BRIEF SUMMARY OF THE INVENTION

Achieving precise control of the GDCI combustion process over the entire speed/load range of the engine (including during speed/load transients), under all ambient temperature conditions presents unique challenges. Control of a GDCI engine may include controlling engine control parameters, such as fuel injection quantity and timing, intake valve timing, exhaust valve timing, exhaust gas recirculation (EGR), intake boost pressure, intake air cooling, EGR cooling, exhaust backpressure, and the like.

At any given engine speed/load point, there is unlikely to be only a single unique combination of engine control parameters at which engine operation is possible; rather there is likely to be a number of different combinations of control parameters, each combination of which may allow the engine to operate. Selection of a particular combination from the plurality of possible combinations at a particular time may be based on achieving a desired balance of performance characteristics.

In a first aspect of the invention, a system for controlling the combustion behavior of an engine is provided. The engine is equipped with a plurality of control subsystems that influence combustion in the engine. The system includes a controller configured to receive a plurality of inputs, to determine a desired subsystem states to operate the engine, and to determine a target value for each of a plurality of control parameters, wherein the target values for one or more control parameters depends on the values of the plurality of inputs. The controller is further configured to communicate the target values of control parameters to the control subsystems.

In a second aspect of the invention, a method for controlling the combustion behavior of a multi-cylinder GDCI engine is provided. The engine is equipped with a plurality of control subsystems that influence combustion in the engine. The method includes a receiving a plurality of inputs, determining a target value for each of a plurality of control parameters, wherein the target values for one or more control parameters depend on the values of the plurality of inputs. The method further includes communicating the target values of control parameters to the control subsystems.

DETAILED DESCRIPTION OF THE INVENTION

As used herein, the terms "charge air" and "air charge" refer to a mixture of gases into which fuel is injected in the combustion chamber. The charge air may include fresh air, recirculated exhaust gas, residual combustion products from a previous combustion event that were not completely expelled from the combustion chamber through an exhaust valve after completion of the combustion event, and exhaust gas rebreathed into the combustion chamber through an exhaust valve that is open for a portion of an intake stroke.

Previous work related to operation of a GDCI engine is described in commonly owned U.S. Patent Application Publication 2013/0213349A1 titled "HIGH-EFFICIENCY INTERNAL COMBUSTION ENGINE AND METHOD FOR OPERATING EMPLOYING FULL-TIME LOW-TEMPERATURE PARTIALLY-PREMIXED COMPRESSION IGNITION WITH LOW EMISSIONS", commonly owned U.S. Patent Application Publication 2013/0298554A1 titled "SYSTEM AND METHOD FOR CONDITIONING INTAKE AIR TO AN INTERNAL COMBUSTION ENGINE", commonly owned U.S. Patent Application Publication 2015/0114339A1 titled "COLD START STRATEGY AND SYSTEM FOR GASOLINE DIRECT INJECTION COMPRESSION IGNITION ENGINE", commonly owned U.S. Patent Application Publication 2015/0152817A1 titled "ADAPTIVE INDIVIDUAL-CYLINDER THERMAL STATE CONTROL USING INTAKE AIR HEATING FOR A GDCI ENGINE", and commonly owned granted U.S. Pat. No. 8,997,698 titled "ADAPTIVE INDIVIDUAL-CYLINDER THERMAL STATE CONTROL USING PISTON COOLING FOR A GDCI ENGINE", the contents of each of which are hereby incorporated by reference in their entirety.

Figure 1:
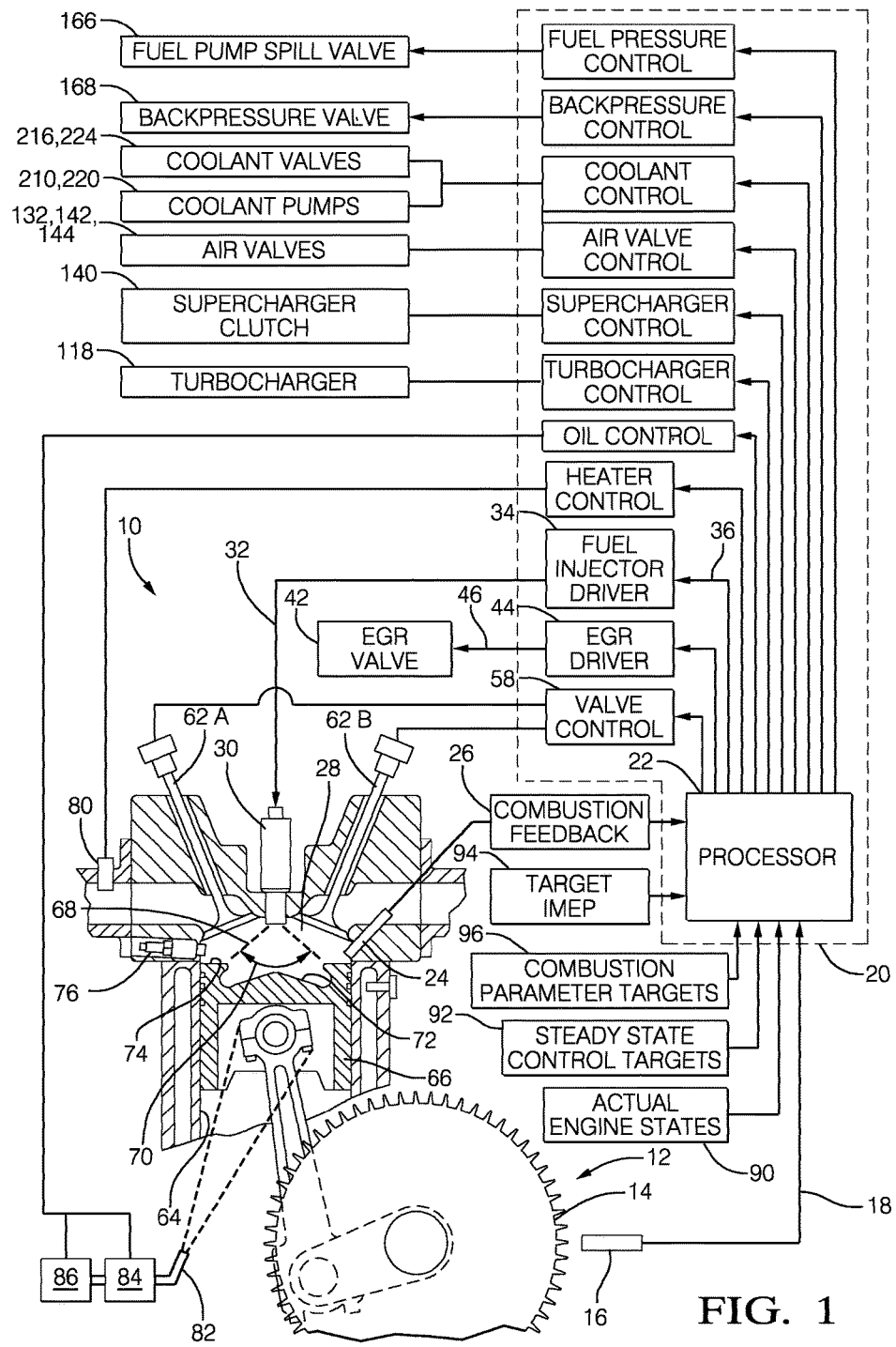
FIG. 1 is a schematic view of an embodiment of an engine control system suitable for controlling a single cylinder of a GDCI engine.

FIG. 1 illustrates a non-limiting embodiment of an engine control system 10 suitable for controlling a single cylinder portion of a GDCI internal combustion engine 12. While only a single cylinder is shown in FIG. 1, it will be appreciated that the present invention may be practiced on each cylinder of a multi-cylinder engine. The engine 12 is illustrated as having a single cylinder bore 64 containing a piston 66, wherein the region above the piston 66 defines a combustion chamber 28. The system 10 may include a toothed crank wheel 14 and a crank sensor 16 positioned proximate to the crank wheel 14 such that the crank sensor 16 is able to sense rotational movement of the crank wheel teeth and output a crank signal 18 indicative of a crank angle and a crank speed.

The engine control system 10 may also include a controller 20, such as an engine control module (ECM), configured to determine a crank angle and a crank speed based on the crank signal 18. The controller 20 may include a processor 22 or other control circuitry as should be evident to those in the art. The controller 20 or processor 22 may include memory, including non-volatile memory, such as electrically erasable programmable read-only memory (EEPROM) for storing one or more routines, thresholds and captured data. The one or more routines may be executed by the processor 22 to perform steps for determining a prior engine control parameter and scheduling a future engine control signal such that a future engine control parameter corresponds to a desired engine control parameter. FIG. 1 illustrates the processor 22 and other functional blocks as being part of the controller 20. However, it will be appreciated that it is not required that the processor 22 and other functional blocks be assembled within a single housing, and that they may be distributed about the engine 12.

Continuing to refer to FIG. 1, the engine control system 10 may include a combustion sensing means 24 configured to output a combustion signal 26 indicative of a combustion characteristic of a combustion event occurring within the combustion chamber 28. One way to monitor the progress of a combustion event is to determine a heat release rate or cumulative heat release for the combustion event. However, because of the number and complexity of measurements, determining heat release may not be suitable for controlling engines during field use such as when engines are operated in vehicles traveling in uncontrolled environments like public roadways. A combustion detection means suitable for field use may provide an indication of a combustion characteristic that can be correlated to laboratory type measurements such as heat release. Exemplary combustion detection means 24 may include a pressure sensor configured to sense the pressure within the combustion chamber 28. Another device that may be useful for indicating some aspect of the combustion process is a combustion knock sensor. Yet another means for indicating an aspect of the combustion process is ion sensing. The combustion detection means 24 may be any one of the exemplary sensors or other suitable sensor known in the art, or a combination of two or more sensors arranged to provide an indication of a combustion characteristic.

The engine control system 10 includes one or more engine control devices operable to control an engine control parameter in response to an engine control signal, wherein the engine control parameter influences when autoignition initiates and the rate at which autoignition propagates through the combustion chamber 28. One example of an engine control device is a fuel injector 30 adapted to dispense fuel 68 in accordance with an injector control signal 32 output by an injector driver 34 in response to an injection signal 36 output by the processor 22. The fuel injector 30 controls delivery to the combustion chamber 28 of fuel supplied by the fuel injector 30 by a fuel pump, where the pressure of the fuel supplied to the fuel injector 30 is controllable by control of a fuel pump spill valve 166. The fuel injection profile may include a plurality of injection events. Controllable aspects of the fuel injection profile may include how quickly or slowly the fuel injector 30 is turned on and/or turned off, a fuel rate of fuel 68 dispensed by the fuel injector 30 while the fuel injector 30 is on, the initiation timing and duration of one or more fuel injections as a function of engine crank angle, the number of fuel injections dispensed to achieve a combustion event, and/or the pressure at which fuel is supplied to the fuel injector 30 by the fuel pump. Varying one or more of these aspects of the fuel injections profile may be effective to control autoignition.

The exemplary engine control system 10 includes an exhaust gas recirculation (EGR) valve 42. While not explicitly shown, it is understood by those familiar with the art of engine control that the EGR valve regulates a rate or amount of engine exhaust gas that is mixed with fresh air being supplied to the engine to dilute the percentage of oxygen in the air mixture received into the combustion chamber 28 and to change the specific heat of the air charge. The controller 20 may include an EGR driver 44 that outputs an EGR control signal 46 to control the position of the EGR valve 42. In a non-limiting embodiment, the EGR driver may, for example, pulse width modulate a voltage to generate an EGR control signal 46 effective to control the EGR valve to regulate the flow rate of exhaust gases received by the engine 12. In an alternative non-limiting embodiment, the EGR valve may be commanded to a desired position by control of a torque motor actuator.

Referring again to FIG. 1, the engine control system 10 may include other engine management devices. For example the engine control system 10 may include a turbocharger 118. The turbocharger 118 receives a turbocharger control signal from a turbocharger control block that may control a boost pressure by controlling the position of a waste gate or bypass valve, or by controlling a vane position in a variable geometry turbocharger (VGT). Additionally, the turbocharger waste gate or VGT may be used to control exhaust backpressure in the exhaust manifold. The engine control system 10 may additionally or alternatively include a supercharger which is mechanically driven by the engine through a supercharger clutch 140, the supercharger clutch 140 being controlled by a supercharger control block in the controller 20. Alternatively, the supercharger may be driven by an electric motor controlled by the supercharger control block in the controller. The engine control system 10 may also include a valve control block 58 that may directly control the actuation of engine intake valve 62A and exhaust valve 62B, or may control the phase of a cam (not shown) actuating the intake valve 62A and/or the exhaust valve 62B, or may control the lift duration of the intake valve 62A and/or the exhaust valve 62B.

With continued reference to FIG. 1, the engine control system may include a controllable backpressure valve 168; a plurality of controllable coolant valves 216, 224; a plurality of controllable coolant pumps 210, 220, and a plurality of air valves 132, 142, 144; each of which will be further discussed below. FIG. 1 also indicates additional inputs to the controller 20, including "ACTUAL ENGINE STATE INFORMATION" 90, "STEADY STATE CONTROL TARGETS" 92, "TARGET IMEP" 94, and "COMBUSTION PARAMETER TARGETS" 96, each of which will be further discussed below.

In order to achieve autoignition of the air-fuel mixture over essentially the entire speed-load range of the engine while achieving exceptional fuel consumption, noise, and emissions results, it has been found advantageous to utilize a multiple late-injection, stratified-mixture, low-temperature combustion process. The method of fuel injection is very important for the success of this process. Fuel 68 is injected by the fuel injector 30, where the fuel injector is fed by a fuel rail at a pressure in the range of 100 to 500 bar, late on the compression stroke using a number of distinct injection events to produce a certain state of controlled air-fuel mixture stratification in the combustion chamber 28. The state of stratification in the combustion chamber 28 controls the time at which autoignition occurs and the rate at which it proceeds. Depending on engine speed and load, single-injection, double-injection, triple-injection, quadruple-injection, quintuple-injection, or higher order strategies may be used. The quantity and timing of each injection is important and must be optimized for best results. Fuel may be injected late on the compression stroke and generally in the range 100 crank angle degrees before top dead center to 10 crank angle degrees after top dead center under most operating conditions, but other conditions may require injection timing outside this range.

In the non-limiting embodiment shown in FIG. 1, the combustion chamber 28 is defined in part by the top surface 74 of the piston 66. The piston 66 is configured so as to define a bowl 72 symmetrically located below the centrally mounted fuel injector 30. The injector is configured to inject fuel 68 over a spray angle 70. The engine 12 may also be equipped with an ignition source such as a spark plug 76 to assist with initial engine starting.

Still with reference to FIG. 1, the engine control system 10 may include one or more intake air heaters 80 configured to heat air at the intake manifold or intake port of each cylinder. Each intake air heater 80 is controllable by a control signal received from an intake air heater control block in a manner to be discussed in further detail below.

Also indicated in FIG. 1 is a nozzle 82 configured to spray oil onto the bottom of the piston 66 to provide cooling of the piston 66. Oil flow to the nozzle 82 is provided by an oil pump 86 that supplies oil to the nozzle 82 through an oil control valve 84. Control of the oil pump 86 and/or of the oil control valve 84 is provided through an oil control block in the controller 20 in a manner to be discussed in further detail below.

Although not specifically indicated in FIG. 1, the engine control system 10 may include additional sensors to measure temperature and/or pressure and/or oxygen concentration and/or humidity at locations within the air intake system and/or the engine exhaust system, which may be included in the "ACTUAL ENGINE STATES" block 90. Also, it is to be noted that the embodiments depicted in FIGS. 1-5 may contain components that are not essential to operate a GDCI engine but may offer benefits if included in an implementation of a GDCI engine system.

Figure 2:
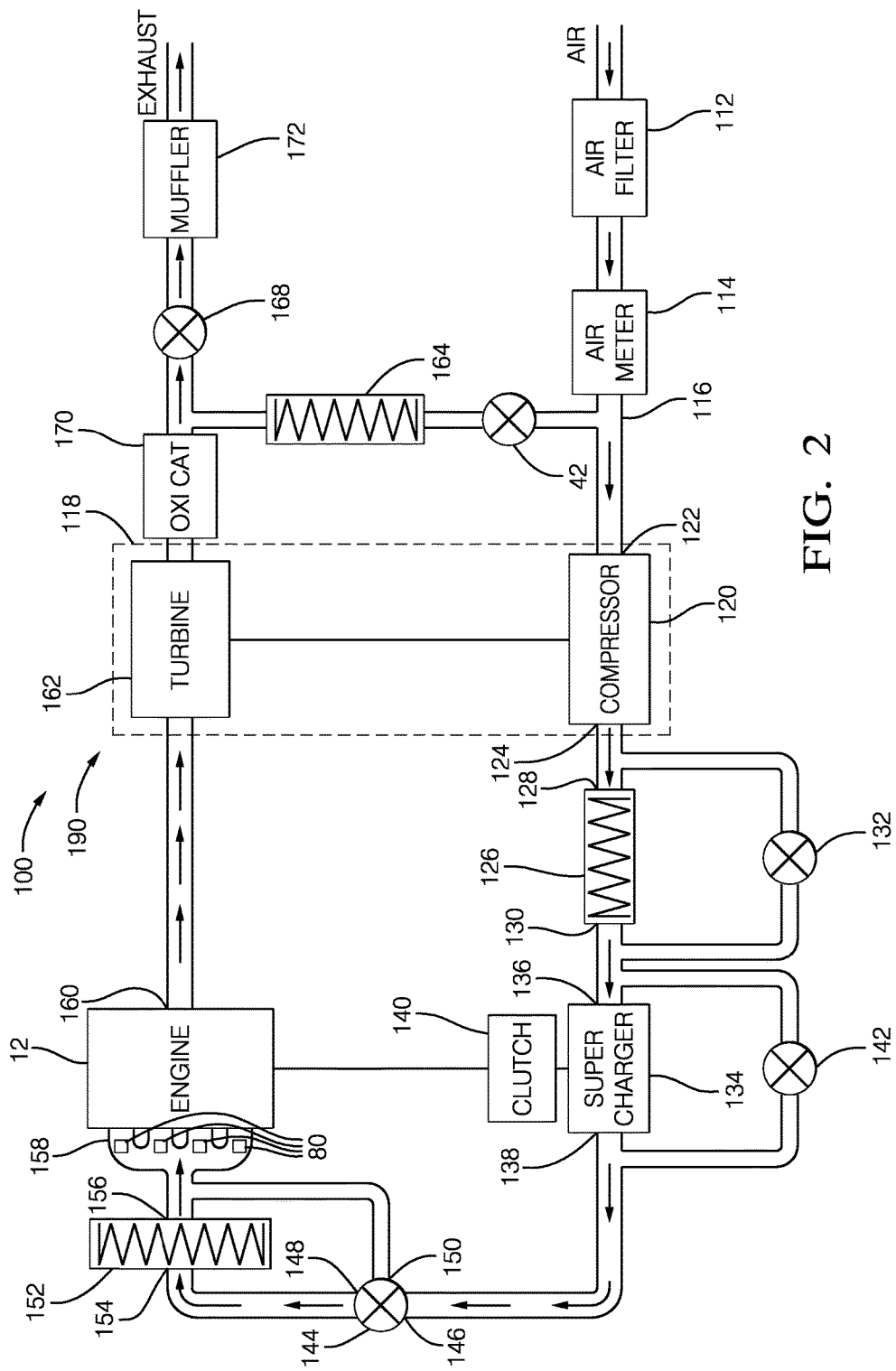
FIG. 2 is a block diagram of an embodiment of the gas (air and/or exhaust) paths of an engine system.

FIG. 2 is a block diagram of a non-limiting embodiment of the gas paths 190 of a system 100 for conditioning intake air into the engine 12 of FIG. 1. This diagram depicts the routing and conditioning of gases (e.g. air and exhaust gas) in the system. It will be appreciated that configurations other than that shown in FIG. 2, for example a configuration using a single air cooler or a configuration with fewer bypass valves, may be feasible.

Referring to FIG. 2, air passes through an air filter 112 and a mass airflow sensor (air meter) 114 into an air duct 116. The air duct 116 channels air into the air inlet 122 of the compressor 120 of a turbocharger 118. Air is then channeled from the air outlet 124 of the compressor 120 to the air inlet 128 of a first charge air cooler 126. The air outlet 130 of the first charge air cooler 126 is connected to the air inlet 136 of a supercharger 134. A first charge air cooler bypass valve 132 is connected between the air inlet 128 and the air outlet 130 of the first charge air cooler 126 to controllably divert air around the first charge air cooler 126.

Continuing to refer to FIG. 2, air at the air outlet 130 of the first charge air cooler 126 is channeled to the air inlet 136 of a supercharger 134, which is driven by the engine 12 through a controllable clutch 140. A controllable supercharger bypass valve 142 is indicated in FIG. 2, allowing air to bypass the supercharger 134. The air from the air outlet 138 of the supercharger 134 or from the supercharger bypass valve 142 is channeled to a first port 146 of a second charge air cooler bypass valve 144. Alternatively, air from air outlet of supercharger 134 is channeled to a first port 146 of a second charge air cooler bypass valve 144 and to the supercharger bypass valve 142 and back to inlet 136 of supercharger 134. The second charge air cooler bypass valve 144 in FIG. 2 allows air entering the first port 146 to be controllably channeled to the second port 148, to the third port 150, or to be blended to both the second port 148 and to the third port 150. Air that is channeled through the second port 148 of the second charge air cooler bypass valve 144 enters an air inlet port 154 of a second charge air cooler 152, through which the air passes by way of an air outlet port 156 of the second charge air cooler 152 to an air intake manifold 158 of the engine 12. Air that is channeled through the third port 150 of the second charge air cooler bypass valve 144 passes directly to the air intake manifold 158 of the engine 12 without passing through the second charge air cooler 152. A plurality of air intake heaters 80 is shown disposed in the air intake manifold 158, with each air intake heater 80 configured to heat air at the intake port of a cylinder of the engine 12. Alternatively, a single heat source may be disposed in the intake manifold 158 so as to heat air supplied to all of the intake ports of the engine 12.

Still with reference to FIG. 2, engine exhaust gas exits an exhaust port 160 of the engine 12 and is channeled to the turbine 162 of the turbocharger 118. Exhaust gas exiting the turbine 162 passes through a catalytic converter 170. Upon exiting the catalytic converter 170, the exhaust gas can follow one of two paths. A portion of the exhaust gas may pass through an EGR cooler 164 and an EGR valve 42, to be reintroduced into the intake air stream at air duct 116. The remainder of the exhaust gas that is not recirculated through the EGR system passes through a backpressure valve 168 and a muffler 172, to be exhausted out a tail pipe.

Figure 3:
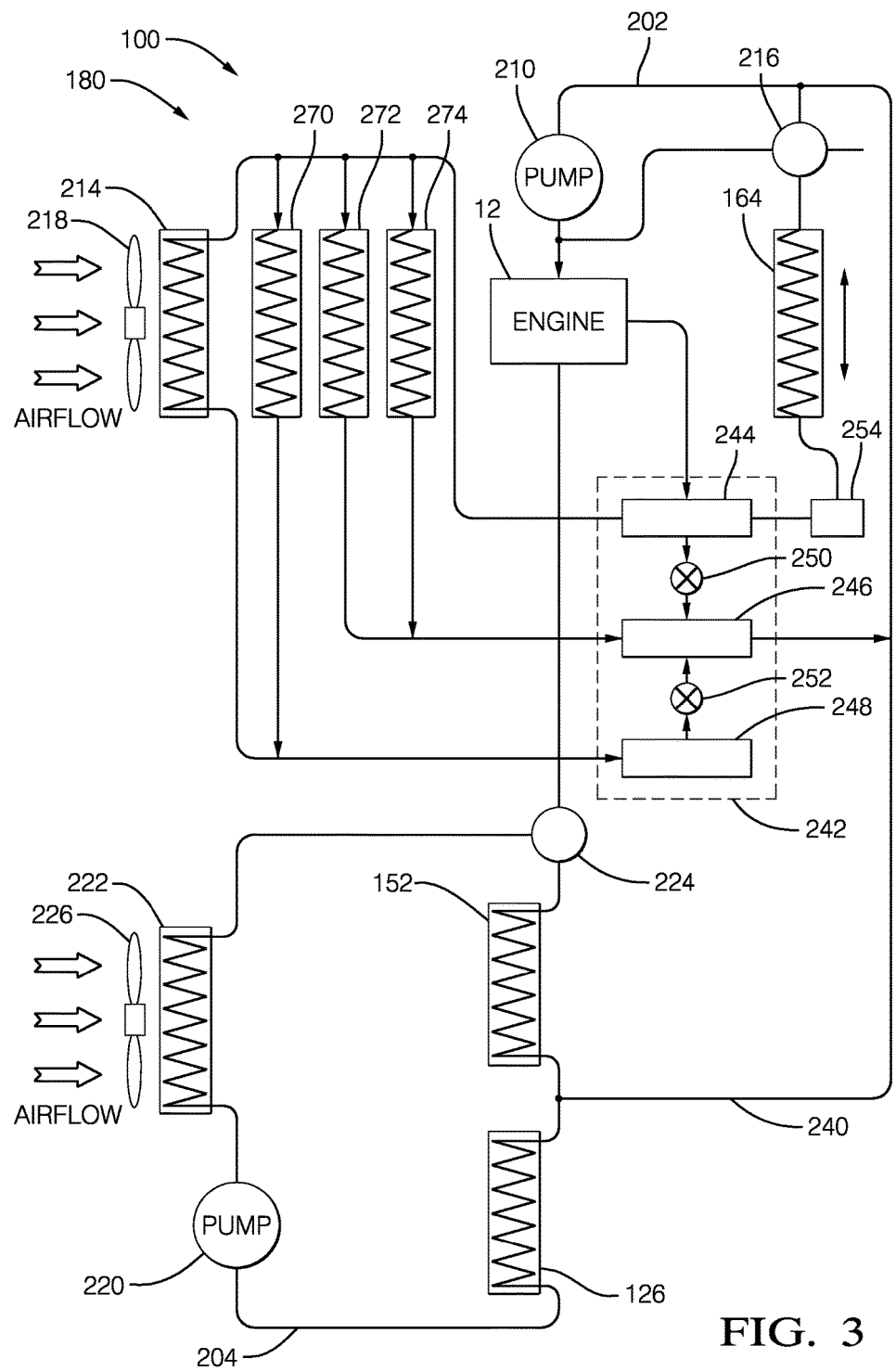
FIG. 3 is a block diagram of an embodiment of the coolant paths of an engine system.

It will be appreciated from the foregoing description of FIG. 2 that the focus of FIG. 2 is on the transport and conditioning of gas constituents, i.e. air into the engine 12 and exhaust gas out of the engine 12. Some of the components in FIG. 2 affect the temperature and/or the pressure of the gas flowing through the component. For example the turbocharger compressor 120 and the supercharger 134 each increase both the temperature and the pressure of air flowing therethrough. The first charge air cooler 126, the second charge air cooler 152, and the EGR cooler 164 are each heat exchangers that affect the temperature of the gas (air or exhaust gas) flowing therethrough by transferring heat between the gas and another medium. In the embodiment of FIGS. 2 and 3, the other heat transfer medium is a liquid coolant, discussed in further detail in relation to FIG. 3. In an alternate embodiment, a gaseous coolant may be used in lieu of a liquid coolant.

FIG. 3 depicts a non-limiting embodiment of coolant paths 180 of the system 100 for conditioning intake air into an engine 12. FIG. 3 includes several components such as the engine 12, the first charge air cooler 126, the second charge air cooler 152, and the EGR cooler 164 that were previously discussed with respect to their functions in the gas paths 190 of the system 100 depicted in FIG. 2. The coolant system 180 may further include an oil cooler 270, a heat exchanger 272 to provide cooling for the turbocharger 118 and a heater core 274, a temperature sensing device, a pressure sensing device, and/or other components not shown in FIG. 2.

Referring to FIG. 3, the coolant paths 180 of the system 100 for conditioning intake air includes a first coolant loop 202. The first coolant loop 202 includes a first coolant pump 210 configured to urge liquid coolant through coolant passages in the engine 12 and through a first radiator 214. The first coolant pump 210 may conveniently be a mechanical pump driven by rotation of the engine 12 or an electric pump. The first radiator 214 may conveniently be a conventional automotive radiator with a controllable first air supply means 218 configured to urge air over the first radiator 214. Preferably the first air supply means 218 comprises a variable speed fan, but the first air supply means 218 may alternatively comprise, by way of non-limiting example, a single speed fan, a two speed fan, a fan of any sort in conjunction with one or more controllable shutters, or the like, without departing from the inventive concept.

Continuing to refer to FIG. 3, the coolant paths 180 of the system 100 includes a thermostat crossover assembly 242 within which is defined a first chamber 244, a second chamber 246, and a third chamber 248. A first thermostat 250 allows fluid communication between the first chamber 244 and the second chamber 246 when the temperature of the coolant at the first thermostat 250 is within a first predetermined range. A second thermostat 252 allows fluid communication between the third chamber 248 and the second chamber 246 when the temperature of the coolant at the second thermostat 252 is within a second predetermined range. It will be appreciated that, while the first chamber 244, the second chamber 246, the third chamber 248, the first thermostat 250, and the second thermostat 252 are depicted as housed in a common enclosure, these components may be otherwise distributed within the system 180 without departing from the inventive concept.

The embodiment depicted in FIG. 3 further includes the EGR cooler 164, one coolant port of which is connected to an optional four-way coolant valve 216. The other coolant port of EGR cooler 164 is fluidly coupled to the first chamber 244 through an orifice 254.

Continuing to refer to FIG. 3, the coolant paths 180 of the system 100 further includes a second coolant loop 204. The second coolant loop 204 includes a controllable second coolant pump 220 configured to urge liquid coolant through a second radiator 222, a three-way coolant valve 224, the second charge air cooler 152, and the first charge air cooler 126. The second radiator 222 may conveniently be a conventional automotive radiator with a controllable second air supply means 226 configured to urge air over the second radiator 222. Preferably the second air supply means 226 comprises a variable speed fan, but the second air supply means 226 may alternatively comprise, by way of non-limiting example, a single speed fan, a two speed fan, a fan of any sort in conjunction with one or more controllable shutters, or the like, without departing from the inventive concept. Alternately, the second radiator 222 may be positioned in line with the first radiator 214 such that the first air supply means 218 urges air over both the second radiator 222 and the first radiator 214, in which case the second air supply means 226 would not be required.

Coolant communication between the first coolant loop 202 and the second coolant loop 204 is enabled by an optional three-way coolant valve 224 and a conduit 240. Control of the four-way coolant valve 216, the three-way coolant valve 224, and/or the second coolant pump 220 may be employed to achieve desired temperature conditioning of intake air.

In the preceding discussion relative to FIGS. 1 through 3, it will be appreciated that the engine control system 10 and the system 100 for conditioning intake air contain several components and subsystems that can influence the temperature and pressure and exhaust gas concentration within the combustion chamber 28. Of these components and subsystems, there are several that have a global effect on the temperature and/or pressure in all cylinders of a multi-cylinder engine.

The turbocharger 118, the supercharger 134, the charge air coolers 126 and 152, the air bypass valves 132, 142, and 146, the EGR cooler 164, the EGR valve 42, the coolant pumps 210, 220, the coolant valves 216, 224, and the intake and exhaust valves 62A, 62B can be considered "global" components in that they each influence the temperature and/or pressure and/or exhaust gas concentration in the combustion chambers 28 of the engine 12, with the temperature and/or pressure and/or exhaust gas concentration in all combustion chambers 28 of a multi-cylinder engine 12 moving in the same direction as a result of a change in the control setting of one of these "global" components.

The GDCI combustion process has demonstrated very high thermal efficiency and very low NOx and particulate matter emissions. The GDCI combustion process includes injecting gasoline-like fuel into the cylinder with appropriate injection timing to create a stratified mixture with varying propensity for autoignition. Heat and pressure from the compression process produces autoignition of the air/fuel mixture in the cylinder with burn duration long enough to keep combustion noise low, but with combustion fast enough to achieve high expansion ratio for all fuel that is burned. Fuel injection into each combustion chamber 28 is tailored to optimize the combustion achieved in that combustion chamber 28, as measured by the combustion sensing means 24 associated with that combustion chamber 28. Unlike the "global" components discussed above, the injection of fuel can be controlled to influence the robustness of combustion on a cylinder-by-cylinder basis. Other controls, such as spark plug 76, intake air heaters 80, and piston coolers 82 provide individual cylinder control as well, as will be discussed in further detail below. Alternative embodiments of control actuators for intake valves 62A and exhaust valves 62B may also provide individual cylinder-by-cylinder control.

A particular challenge in GDCI combustion is maintaining robust combustion in each combustion chamber. Gasoline-like fuel has characteristics such that it is resistant to autoignition. As a result, unlike a conventional spark ignition gasoline engine, a GDCI engine requires relatively tight control of the in-cylinder pressure and temperature to robustly achieve and maintain compression ignition.

A multi-cylinder engine presents challenges in matching the characteristics that are important to maintaining robust and stable compression ignition with gasoline-like fuel. It is known that all cylinders of a multi-cylinder internal combustion engine do not operate at precisely the same conditions. Compression ratio may vary from cylinder-to-cylinder due to manufacturing tolerances, wear, or deposits in a combustion chamber. Temperature may vary from cylinder to cylinder due to differences in heat transfer from the cylinder to the coolant and to ambient air, for example with middle cylinders operating hotter than outer cylinders. Air flow into each combustion chamber may differ due to intake manifold geometry, and exhaust flow out of each combustion chamber may differ due to exhaust manifold geometry. Other sources of variability may include differences in fuel delivery amount or spray pattern due to tolerances associated with the fuel injector 30. While control of the "global" components discussed above may be useful to achieve a desired minimum temperature, desired average temperature, or desired maximum temperature under steady-state conditions, the "global" systems are not able to compensate for the cylinder-to-cylinder differences that impede achieving optimal conditions in all cylinders of a multi-cylinder engine. Additionally, under transient engine operating conditions, i.e. changing engine speed and/or load, the response time of the "global" components to influence combustion chamber temperature may be too slow to allow robust and stable GDCI combustion during the time that the engine is transitioning from one speed/load state to another.

To achieve robust, stable GDCI combustion in a multi-cylinder engine, it is desirable to provide means for influencing the temperature and/or pressure in each individual combustion chamber. One way to achieve this is to provide a plurality of intake air heaters 80, with each cylinder of the engine 12 having an associated intake air heater 80 to increase the temperature of the air entering that cylinder. In a non-limiting embodiment, each heater 80 may be disposed in an intake runner of the intake manifold 158, as depicted in FIG. 2.

Figure 4:
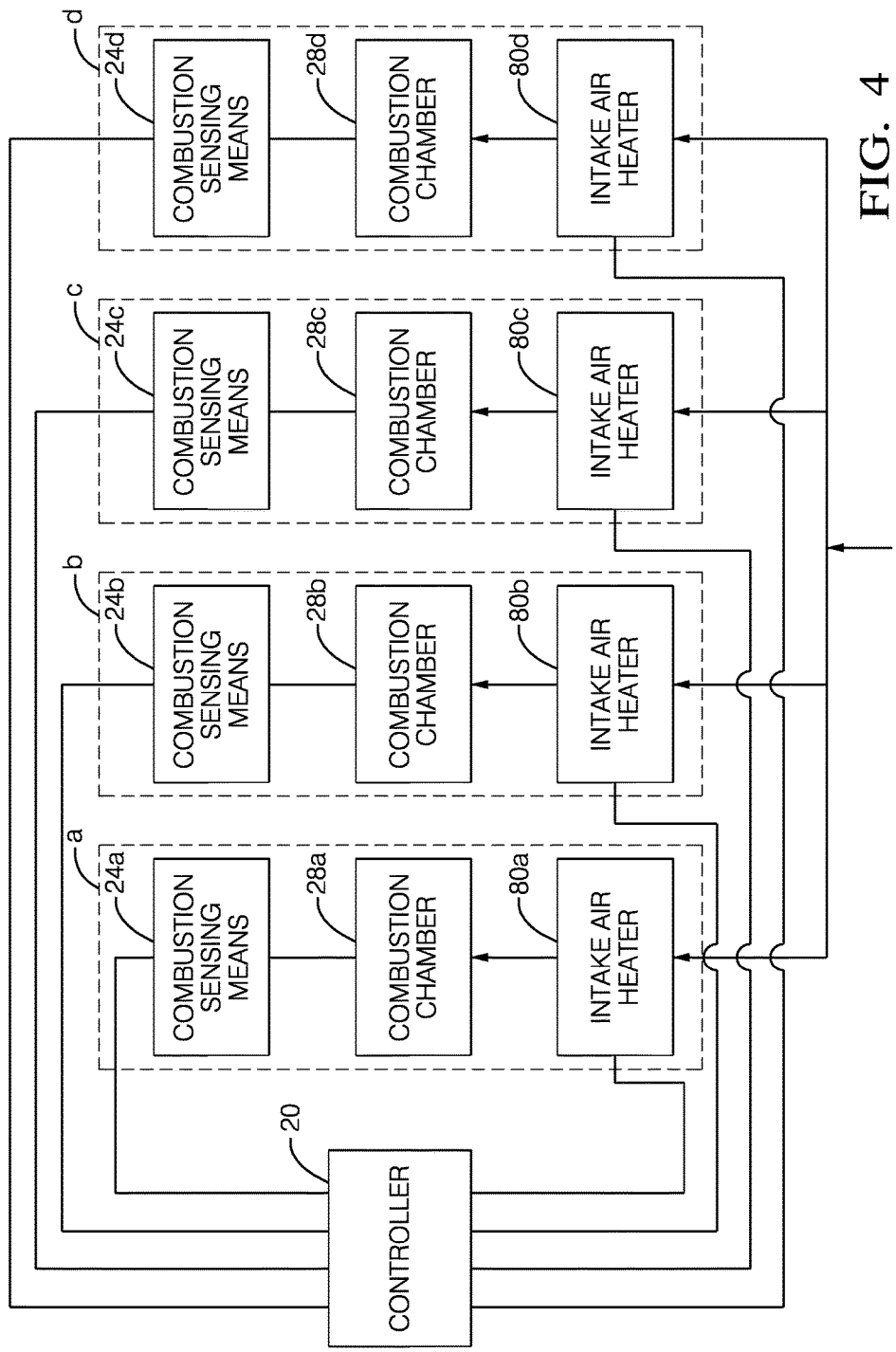
FIG. 4 is a schematic diagram depicting an intake air heater system for a multi-cylinder engine.

FIG. 4 is a schematic diagram depicting an intake air heater system for a multi-cylinder engine. In FIG. 4, lines with arrowheads at one end are used to indicate air flow, with the arrowhead indicating the direction of air flow. FIG. 4 includes dashed boxes denoted as a, b, c, and d, each associated with one of four cylinders in a four cylinder engine. Within each dashed box, features introduced above with reference to FIG. 1 are identified with the reference numeral of FIG. 1 with a letter appended to the numeral, the letter corresponding to the cylinder identification associated with the feature. For example, "80*a*" in FIG. 4 represents the intake air heater 80 that is associated with cylinder "a" "28*a*" represents the combustion chamber 28 associated with cylinder "a", and "24*a*" represents the combustion sensing means associated with cylinder "a". The same numbering convention is used for cylinders "b", "c", and "d".

Referring to FIG. 4, an intake air heater 80*a* is configured to heat air entering the intake port of the combustion chamber 28*a*. When GDCI combustion occurs in the combustion chamber 28*a*, combustion characteristics are detected by the combustion sensing means 24*a*. A signal from the combustion sensing means 24*a* indicative of a combustion characteristic in combustion chamber 28*a* is provided to the controller. The controller is configured to provide a control signal to the air intake heater 80*a* in response to the combustion characteristic detected by the combustion sensing means 24*a*, thereby enhancing the robustness of GDCI combustion in the combustion chamber 28*a*. A corresponding relationship exists between the corresponding components within each of the other cylinders "b", "c", and "d", As indicated in FIG. 4, each of the cylinders a, b, c, d is associated with a corresponding intake air heater 80*a*, 80*b*, 80*c*, and 80*d* respectively. Each of the cylinders a, b, c, and d additionally has a corresponding combustion sensing means 24*a*, 24*b*, 24*c*, and 24*d* respectively. The controller is configured to receive signals from each individual combustion sensing means 24*a*, 24*b*, 24*c*, 24*d* indicative of a combustion characteristic in that cylinder, and to provide an appropriate control signal to an individual intake air heater 80*a*, 80*b*, 80*c*, 80*d* to influence the intake air temperature in that cylinder, where each control signal based on the combustion characteristic measured in the respective combustion chamber 28*a*, 28*b*, 28*c*, 28*d*. Accordingly, the temperature in each cylinder can be optimized to maximize the robustness of GDCI combustion in each individual cylinder beyond the capabilities of the "global" components described above.

In an embodiment of the invention, a plurality of temperature sensors may be provided, with one of the plurality of temperature sensors associated with each of the heaters 80*a*, 80*b*, 80*c*, and 80*d*. By way of non-limiting example, a temperature sensor may be disposed so as to directly measure a temperature of a particular heater 80*a*, 80*b*, 80*c*, 80*d*, a temperature of air in the intake manifold 158 heated by a particular heater 80*a*, 80*b*, 80*c*, 80*d*, or a temperature in a particular combustion chamber 28*a*, 28*b*, 28*c*, 28*d* that receives air heated by a particular heater 80*a*, 80*b*, 80*c*, 80*d*. In an alternative embodiment, the temperature of each heater may be estimated using a model of the heater temperature. Information from the temperature sensor may be used to influence the control of power to the particular heater, for example to limit the heater power so as not to exceed a predetermined maximum heater temperature.

Control of each heater 80*a*, 80*b*, 80*c*, 80*d* may be achieved, for example, by using solid state relays (not shown) to control current through each heater 80*a*, 80*b*, 80*c*, 80*d*. The heat delivered by each heater 80*a*, 80*b*, 80*c*, 80*d* may be controlled, for example, by pulse width modulation of the current through the heater 80*a*, 80*b*, 80*c*, and 80*d*.

Figure 5:
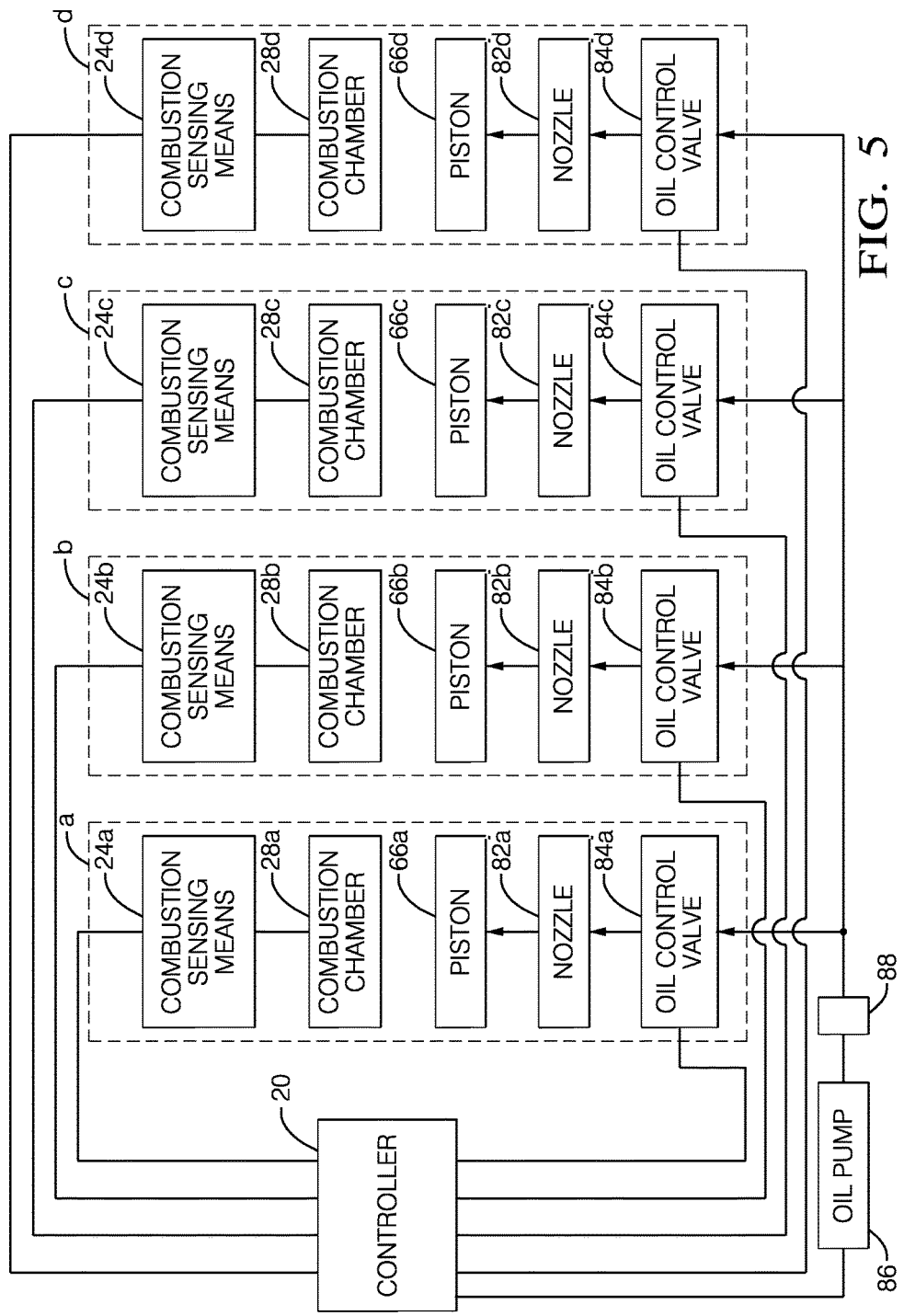
FIG. 5 is a schematic diagram depicting a piston cooling system for a multi-cylinder engine.

In addition to using individually controllable intake air heaters 80*a*, 80*b*, 80*c*, 80*d* to increase combustion chamber temperature on a cylinder-by-cylinder basis, piston cooling by a plurality of individually controllable oil jets may be used to decrease combustion chamber temperature on a cylinder-by-cylinder basis. FIG. 5 is a schematic diagram depicting piston cooling system for a multi-cylinder engine. In FIG. 5, lines with arrowheads at one end are used to indicate oil flow, with the arrowhead indicating the direction of oil flow. FIG. 5 includes dashed boxes denoted as a, b, c, and d, each associated with one of four cylinders in a four cylinder engine. Within each dashed box, features introduced above with reference to FIG. 1 are identified with the reference numeral of FIG. 1 with a letter appended to the numeral, the letter corresponding to the cylinder identification associated with the feature. For example, "82*a*" in FIG. 4 represents the oil nozzle 82 that is associated with cylinder "a".

Referring to FIG. 5, a nozzle 82*a* is configured to spray oil onto the piston 66*a* that partially defines the combustion chamber 28*a*. Oil supply to the nozzle 82*a* is provided by an oil pump 86 through an oil control valve 84*a*. The oil that is sprayed onto the piston 66*a* serves to remove heat from the piston 66*a*, thereby lowering the temperature in the combustion chamber 28*a*. When GDCI combustion occurs in the combustion chamber 28*a*, one or more combustion characteristics are detected by the combustion sensing means 24*a*. A signal from the combustion sensing means 24*a* indicative of a combustion characteristic in combustion chamber 28*a* is provided to the controller 20. The controller 20 is configured to provide a control signal to the oil control valve 84*a* in response to the combustion characteristic detected by the combustion sensing means 24*a*, thereby enhancing the robustness of GDCI combustion in the combustion chamber 28*a*. A corresponding relationship exists between the corresponding components within each of the other cylinders "b", "c", and "d", As indicated in FIG. 5, each of the cylinders a, b, c, d is associated with a corresponding oil control valve 84a, 84b, 84c, and 84d respectively. Each of the cylinders a, b, c, and d additionally has a corresponding combustion sensing means 24a, 24b, 24c, and 24d respectively. The controller is configured to receive signals from each individual cylinder indicative of a combustion characteristic in that cylinder, and to provide an appropriate control signal to an individual oil control valve 84a, 84b, 84c, and 84d to influence the temperature in that cylinder, where each control signal based on the combustion characteristic measured in the respective combustion chamber 28a, 28b, 28c, 28d. Accordingly, the temperature in each cylinder can be optimized to maximize the robustness of GDCI combustion in each individual cylinder beyond the capabilities of the "global" components described above.

Control of each oil control valve 84a, 84b, 84c, and 84d may be achieved, for example, by using solid state relays (not shown) to control voltage and/or current to each oil control valve 84a, 84b, 84c, and 84d. In the embodiment shown in FIG. 5, each oil control valve 84a, 84b, 84c, and 84d is supplied oil by a common oil pump 86. As indicated in FIG. 5, the oil pump 86 is controllable by a signal from the controller 20, thereby reducing parasitic losses when full oil flow or pressure is not required. By way of non-limiting example, the oil pump may be a two-step oil pump or a continuously variable oil pump. The viscosity of oil is dependent on its temperature, and the spray characteristics of the nozzles 82a, 82b, 82c, 82d are dependent on oil pressure and oil viscosity. In a non-limiting embodiment, as shown in FIG. 5, a sensor 88 may be provided to measure the pressure and/or temperature of pressurized oil made available to the oil control valves 84a, 84b, 84c, and 84d by the oil pump 86. Alternatively, individual pressure and/or temperature sensors may be provided between each oil control valve 84a, 84b, 84c, 84d and its corresponding nozzle 82a, 82b, 82c, 82d.

For GDCI engine operation using a plurality of intake air heaters 80a, 80b, 80c, 80d to condition intake air to the combustion chambers 28a, 28b, 28c, 28d, part-to-part variability between individual heaters 80a, 80b, 80c, 80d, as well as differences in aging characteristics between individual heaters 80a, 80b, 80c, 80d, may contribute to further cylinder-to-cylinder variability. In an embodiment of the present invention, the control parameters associated with each individual heater 80a, 80b, 80c, 80d, or a relationship between the control parameters associated with each individual heater 80a, 80b, 80c, 80d that produce the desired combustion characteristics, as described above, may be retained in non-volatile memory, for example in the controller 20. These "learned" values may then be used as initial values in determining heater control parameters to be used to control individual heaters 80a, 80b, 80c, and 80d during a subsequent engine operating event.

For GDCI engine operation using a plurality of nozzles 82a, 82b, 82c, 82d, each fed by a corresponding oil control valve 84a, 84b, 84c, 84d, to provide piston cooling and thereby influence the temperature in the combustion chambers 28a, 28b, 28c, 28d, part-to-part variability between individual nozzles 82a, 82b, 82c, 82d and oil control valves 84a, 84b, 84c, 84d, as well as aging characteristics of the oil pump 86 and/or differences in aging characteristics between individual nozzles 82a, 82b, 82c, 82d, and oil control valves 84a, 84b, 84c, 84d, may contribute to further cylinder-to-cylinder variability. In an embodiment of the present invention, the control parameters associated with the oil pump 86 and with each individual oil control valve 84a, 84b, 84c, 84d, or a relationship between the control parameters associated with each individual oil control valve 84a, 84b, 84c, 84d, that produce the desired combustion characteristics at each of a plurality of engine speed and load conditions, may be retained in non-volatile memory, for example in the controller 20. These "learned" values may then be used as initial values in determining control parameters to be used to control the oil pump 86 and/or to control individual oil control valves 84a, 84b, 84c, and 84d during a subsequent engine operating event at the corresponding engine speed and load conditions.

The combustion sensing means 24 may include a pressure sensor configured to sense the pressure within the combustion chamber 28 and/or a temperature sensor configured to sense the temperature in the combustion chamber. Measurements made by these sensors may be used directly, or may be processed to derive other combustion-related parameters. By way of non-limiting example, control of the intake air heaters 80a, 80b, 80c, 80d, and/or the oil control valves 84a, 84b, 84c, 84d, may be based on combustion chamber temperature, combustion chamber pressure, crank angle corresponding to start of combustion (SOC), crank angle corresponding to 50% heat release (CA50), heat release rate, maximum rate of pressure rise (MPRR), location of peak pressure (LPP), ignition dwell (i.e. elapsed time or crank angle between end of fuel injection and start of combustion), ignition delay (i.e. elapsed time or crank angle between start of fuel injection and start of combustion), combustion noise level, or on combinations of one or more of these or other similar parameters.

In a first operating mode of a GDCI engine system, the "global" components that influence combustion chamber temperature as described above may be controlled so as to establish temperatures in each combustion chamber that, absent a heat contribution from the intake air heaters, would be at or below the temperature corresponding to the optimum temperature for robust combustion in all combustion chambers. The intake air heaters 80a, 80b, 80c, and 80d may then be controlled to supply supplemental heat to their corresponding combustion chambers 28a, 28b, 28c, 28d as appropriate to achieve robust combustion in each combustion chamber 28a, 28b, 28c, 28d.

In a second operating mode of a GDCI engine system, the "global" components that influence combustion chamber temperature as described above may be controlled so as to establish temperatures in each combustion chamber that, absent a cooling effect from oil spray on the pistons, would be at or above the temperature corresponding to the optimum temperature for robust combustion in all combustion chambers. The oil control valves 84a, 84b, 84c, 84d may then be controlled to remove heat from their corresponding combustion chambers 28a, 28b, 28c, 28d by cooling their corresponding pistons 66a, 66b, 66c, 66d as appropriate to achieve robust combustion in each combustion chamber 28a, 28b, 28c, 28d.

In a third operating mode of a GDCI engine system, the "global" components that influence combustion chamber temperature as described above may be controlled so as to establish temperatures in each combustion chamber that, absent a heating effect from air intake heaters and a cooling effect from oil spray on the pistons, would be such that at least one combustion chamber would require supplemental heating to achieve the optimum temperature for robust combustion in that combustion chamber, and at least one other combustion chamber would require supplemental cooling to achieve the optimum temperature for robust combustion in that combustion chamber. The intake air heaters 80*a*, 80*b*, 80*c*, 80*d*, and the oil control valves 84*a*, 84*b*, 84*c*, 84*d* may then be simultaneously controlled to achieve robust combustion in each combustion chamber 28*a*, 28*b*, 28*c*, 28*d*.

The first operating mode, second operating mode, and third operating mode as described above may all be employed in a given GDCI engine system at different times, depending on factors including but not limited to engine speed, engine load, engine temperature, ambient temperature, whether the engine is warming up or fully warmed, and whether engine speed and load are in a steady state or a transient state. Selection of an operating mode may be influenced by other factors, such as the desire to minimize parasitic loads on the engine, such as the need to provide energy to the heaters 80*a*, 80*b*, 80*c*, 80*d*, to the oil control valves 84*a*, 84*b*, 84*c*, 84*d*, to the oil pump 86, and/or to the coolant pumps 210, 220. Other considerations may also influence the selection of an operating mode. For example, while the engine is warming up, it may be desirable to operate the heaters 80*a*, 80*b*, 80*c*, and 80*d* to provide the maximum air heating that can be accommodated to achieve robust combustion through control of fuel injection parameters, in order to accelerate light-off of the catalyst 170. In a transient condition, for example when the engine is accelerating, a piston cooling system as depicted in FIG. 5 may provide improved response time for controlling combustion chamber temperature compared with the response time of the "global" components discussed above. This improved response time may enable enhanced stability of the multi-cylinder engine.

The equivalence ratio $\Phi$ of an air-fuel mixture is defined as the ratio of fuel-to-air ratio of the mixture to the stoichiometric fuel-to-air ratio. A value of $\Phi>1$ indicates a rich air-fuel mixture (excess fuel), while a value of $\Phi<1$ indicates a lean air-fuel mixture (excess air).

It will be appreciated that the distribution of fuel 68 in the combustion chamber 28 will be influenced by at least the injector design, combustion chamber design, engine speed, injection pressure, the pressure and temperature in the combustion chamber 28 at the time of the injection (which is a function of the crank angle at the time of injection), and the amount of fuel injected. By controlling the number of injection events, the start of injection (SOI) timing, end of injection (EOI) timing, and amount (Q) of fuel injected for each injection event, the intentional stratification of fuel 68 in the combustion chamber 28 can be controlled. The autoignition delay characteristic of the air-fuel mixture depends on the fuel stratification. By controlling the stratification of fuel 68 in the combustion chamber 28, a distribution of autoignition timing can be produced which smoothes the heat release process. Combustible air-fuel mixtures beyond the boundary of the controlled combustion autoignition zone can be reduced, thereby avoiding traditional end-gas combustion knock. This is in contrast with HCCI, wherein the homogeneous nature of the air-fuel mixture in the combustion chamber produces a single autoignition delay time with corresponding rapid heat release, which in turn can produce high combustion noise. To achieve low NOx and PM emissions the fuel-air combustion in GDCI must occur throughout the combustion chamber within a limited range of temperature-$\Phi$ conditions. Fuel must be sufficiently mixed prior to attaining autoignition temperature so the combustion process is controlled by the fuel reactivity rather than diffusion or post-start-of-combustion mixing. Proper combustion temperature-$\Phi$ conditions enable low enough temperature to avoid NOx formation and lean enough $\Phi$ to avoid PM formation, both of which are impossible to avoid with diffusion controlled combustion. The combustion must simultaneously be hot enough and rich enough to avoid CO formation or cause excessive HC emissions due to incomplete combustion.

Lower peak temperatures of ideal combustion temperature-$\Phi$ mixtures enable lower heat losses to combustion chamber surfaces and lower exhaust gas temperatures which results in higher thermal efficiency and minimum fuel consumption in GDCI.

Low combustion noise is achieved in GDCI when the ignition dwell is sufficiently long and autoignition occurring within the combustion chamber is phased such that the fuel does not all ignite simultaneously. Proper fuel autoignition properties and $\Phi$ mixture stratification allows staging of the ignition to occur over a moderate crank angle duration rather than instantaneously and results in a lower peak heat release rate and lower peak pressure rise rate to mitigate combustion noise.

A typical "gasoline" comprises a mixture of hydrocarbons that boil at atmospheric pressure in the range of about 25° C. to about 225° C., and that comprise a major amount of a mixture of paraffins, cycloparaffins, olefins, and aromatics, and lesser or minor amounts of additives. Unleaded regular gasoline (RON91) has a relatively high octane index. For compression ignition systems, this translates into long ignition dwell for operating conditions at low loads, low ambient temperatures, or during cold start and early warm-up. Autoignition may fail to occur or may be too weak or too late (i.e., on the expansion stroke) under these conditions. Additional mixture heat is needed for these special conditions.

Compression heating of the mixture from higher compression ratio is helpful. A higher compression ratio significantly increases mixture temperature near top dead center. Use of intake valve closing (IVC) near bottom dead center is also helpful to maximize both volumetric efficiency and effective compression ratio, and provide further mixture heating. However, more mixture heat may be needed to insure that autoignition is robust and that start of combustion, ignition dwell, and crank angle of 50 percent mass burn fraction (CA50) are in the proper ranges. Mixture temperature at the end of compression needs to be modulated in concert with the fuel injection process to achieve target start of combustion, ignition dwell, and CA50. If sufficient heat can be obtained, robust compression ignition is feasible during a cold start. Alternatively, robust compression ignition may be feasible just a few cycles after the first combustion event during an extreme cold start, with an auxiliary ignition source such as spark plug 76 potentially used to initially start a cold engine. Other starting aids, such as glow plugs, may be used without departing from the present invention.

The hot exhaust gas (residuals) from internal combustion engines is one large source of charge air mixture heating that can be controlled very quickly over wide ranges using variable valvetrain mechanisms. From a response time standpoint, residual gas is preferred to other methods of heating such as intake air heaters, or high-pressure-loop (HPL) EGR that have relatively slow response.

Generally, three variable valve strategies are known to control residual gases in DOHC engines including 1) positive valve overlap (PVO), which causes backflow and re-induction of hot residual gases in the intake port(s), 2) negative valve overlap (NVO), which traps exhaust gases in cylinder by early exhaust valve closing, and 3) rebreathing (RB) of hot exhaust gases from the exhaust port(s) during the intake stroke by a secondary exhaust event.

Due to limited valve-to-piston clearance for engines with higher compression ratio, PVO is not preferred. NVO can be effective to trap hot exhaust gases but has losses associated with recompression of the gases and heat transfer. NVO also requires variable control of both intake and exhaust valves, which is complex and expensive for continuously variable systems.

Rebreathing of hot exhaust gases from the exhaust ports is the preferred strategy. It can be implemented with a secondary exhaust event during the intake stroke. Both "early" secondary valve lift events and "late" secondary valve lift events are considered. In general, "mid-stroke" secondary events are not preferred due to high piston speeds and greater sensitivity to valve opening/closing time at mid-stroke.

Rebreathing can be implemented using continuously variable valve actuation or discrete 2-step or 3-step exhaust variable valve actuation mechanisms. This leaves the intake valve train available for other variable valve actuation functions, such as late intake valve closing. For 2-step exhaust rebreathing, independent control of the two exhaust valves may be used to control residual gas in 3 levels (one low exhaust lift; one high exhaust lift, both valves open).

Rebreathing is also important during cold starts and warm-up to increase and maintain exhaust temperatures for efficient catalyst operation. Depending on catalyst type, conversion of exhaust species begins to occur at various temperatures (e.g. 200° C. for SCR catalysts). By rebreathing hot exhaust gases from the exhaust ports, intake air flow is reduced and exhaust temperatures increase. In this manner, rebreathing can be controlled during warm-up to promote autoignition and also greatly accelerate catalyst light-off.

Rebreathing can also be controlled under warm idle and light loads for catalyst maintenance heating. In this case, if catalyst temperatures drop or cool down below a certain threshold, rebreathing can be increased such that catalyst temperature is always maintained. Some adjustment to injection characteristics is expected in maintenance heating mode.

For deceleration conditions, during which fuel may be shut off, catalyst cooling from engine air needs to be minimized. Rebreathing can be used at high levels to reduce the air flow rate through the engine and catalyst. Catalyst cooling can be significantly reduced.

For high load conditions, low amounts of hot residuals are desired for combustion phasing control. This can be achieved by using high geometric compression ratio, for which the cylinder clearance volume is low, together with intake boost pressure. When rebreathing is zero, residual gas levels of about 2 percent by mass have been measured for geometric compression ratio of 16.2.

Figure 6:
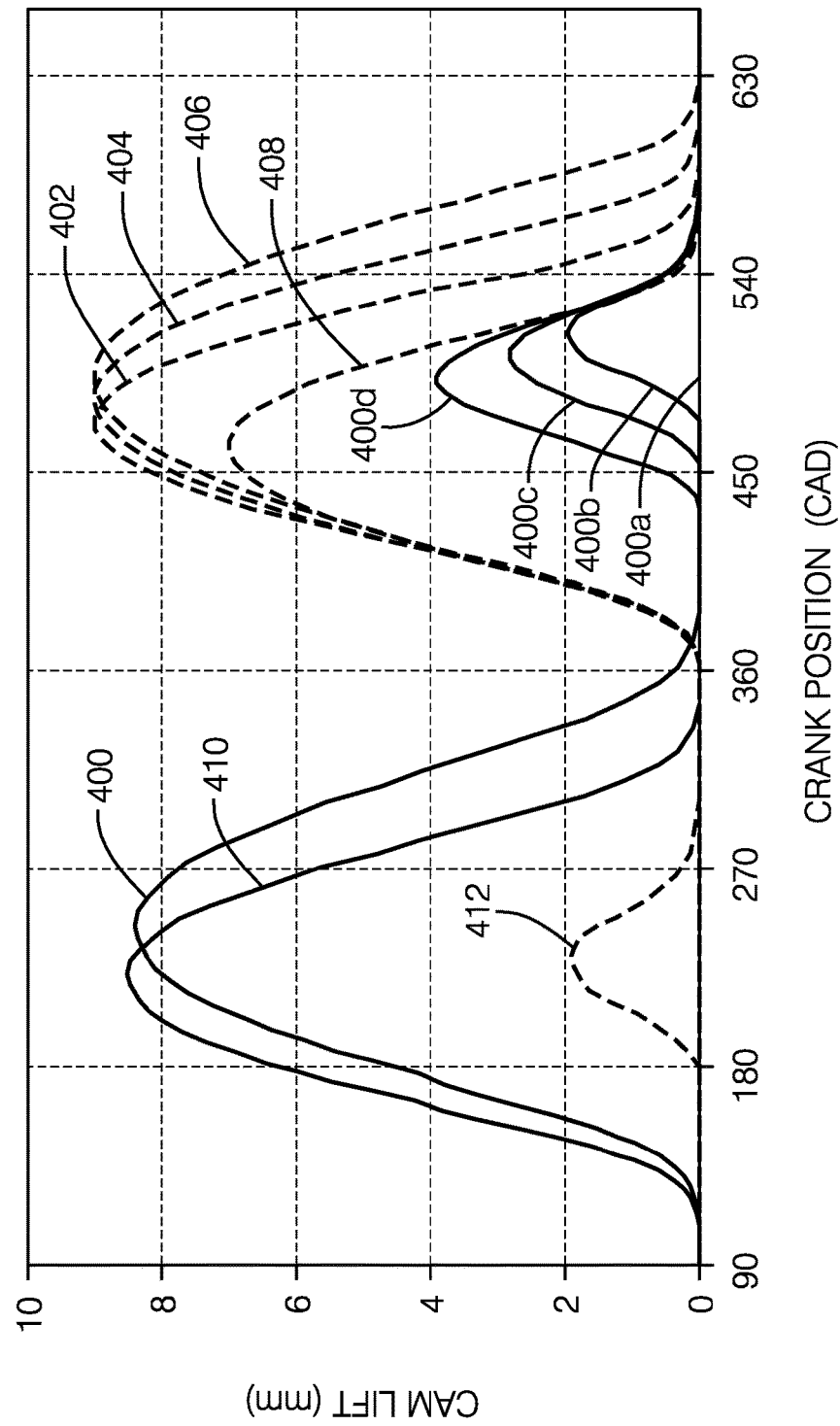
FIG. 6 is a graph illustrating valve lift profiles.

Valve lift profiles illustrating the valve strategies described above are shown in FIG. 6, with solid lines indicating exhaust valve profiles and dashed lines indicating intake valve profiles. The horizontal axis in FIG. 6 represents crank position expressed in crank angle degrees. In FIG. 6, crank angles from 0 to 180 degrees represent a power stroke, with 0 degrees representing top dead center piston position and 180 degrees representing bottom dead center piston position. Crank angles from 180 degrees to 360 degrees represent an exhaust stroke, with 360 degrees representing top dead center piston position. Crank angles from 360 degrees to 540 degrees represent an intake stroke, with the piston at bottom dead center at a crank angle of 540 degrees. Crank angles from 540 degrees to 720 degrees represent a compression stroke, with the piston at top dead center at a crank angle of 720 degrees.

Profile 400 of FIG. 6 indicates a lift profile for an exhaust cam. Lift profile 400a represents an exhaust valve profile with no rebreathing lift during the intake stroke. A number of "late" secondary exhaust profiles 400b, 400c, and 400d to achieve rebreathing of residual gas are shown during the later portion of the intake stroke. Exhaust valve profile 400b will provide a relatively low amount of exhaust rebreathing, with profile 400c providing more rebreathing than profile 400b, and profile 400d providing more rebreathing than profile 400c. "Early" secondary exhaust profiles are equally feasible but are not shown.

Trace 410 in FIG. 6 illustrates an exhaust valve profile incorporating negative valve overlap (NVO). As shown by trace 410, negative valve overlap traps exhaust gases in the cylinder by early exhaust valve closing, i.e. before the piston has reached top dead center on the exhaust stroke.

Trace 412 in FIG. 6 illustrates a positive valve overlap intake valve profile, incorporating a secondary intake event while the exhaust valve is open. This valve state can result in exhaust backflow into the intake port and reintroduction of residual burned gases into the combustion chamber.

For medium-to-high-load operation, fuel mass and global $\Phi$ are increased. This tends to promote early autoignition and may lead to higher NOx emissions and higher combustion noise. To counteract this effect, EGR is increased as well as intake pressure to maintain charge air oxygen mass, which in turn increases cylinder charge air pressure and temperature.

An effective strategy to lower the cylinder pressure and temperature during compression is to reduce the effective compression ratio (ECR) of the engine. The effective compression ratio is defined as the ratio of the volume of the combustion chamber at the time that the intake and exhaust valves close divided by the clearance volume of the combustion chamber at top dead center piston position. The effective compression ratio can be reduced by employing "late intake valve closing" (LIVC). Traces 402, 404, and 406 in FIG. 6 represent intake valve profiles for LIVC. In FIG. 6, trace 402 represents an intake valve profile with a low degree of LIVC, trace 404 indicates an intake valve profile with a moderate degree of LIVC, and trace 406 represents an intake valve profile with a high degree of LIVC.

A "BDC intake cam", which provides effective intake closing near bottom dead center, provides maximum volumetric efficiency and maximum trapped air for GDCI combustion at low engine speeds. This provides the greatest compression pressures and temperatures at light loads. A BDC intake cam profile is shown as profile 408 in FIG. 6.

In SAE paper No. 2014-01-1300 by Sellnau et al. titled "Development of a Gasoline Direct Injection Compression Ignition (GDCI) Engine", the authors describe the desirability of controlling the engine such that combustion takes place in a preferred region in the $\Phi$-temperature domain to avoid formation of particulates, NOx, and CO. This requires control of fuel injection so that the injected fuel follows a desired trajectory in the $\Phi$-temperature domain, as well as control of conditions in the combustion chamber prior to the start of combustion, to achieve a desired fuel stratification. In the GDCI combustion process, fuel stratification is desired, i.e. the fuel should encompass a desired range of $\Phi$ immediately prior to initiation of combustion. In contrast, in an HCCI engine where fuel is injected early enough to allow complete mixing and homogenization of the air/fuel mixture all of the air/fuel mixture is at a single value of $\Phi$ at the time of combustion. Therefore, in GDCI combustion fuel injection and charge air preparation are much more critical than in typical spark ignition or compression ignition combustion control systems.

While it may be useful to consider the Φ-temperature domain from a conceptual viewpoint as described in the aforementioned SAE paper No. 2014-01-1300, characterization of the combustion trajectory in the Φ-temperature domain cannot be practicably performed in real time in an operating motor vehicle. As a practical matter, control of the engine must be based on information that is readily available to the controller in real time. Transient, real time control of a GDCI engine over the entire speed-load range of the engine, over the entire ambient temperature and pressure range to be encountered in the service environment of the engine, over the entire range of fuel properties to be encountered in the service of the engine, and over the entire operating lifetime of the engine, presents challenges beyond those found in controlling typical spark ignition or typical compression ignition (e.g. diesel or HCCI) engines.

From the foregoing description, it will be appreciated that there are a number of controllable engine systems and subsystems that can affect Φ and temperature in time and space during an engine combustion cycle. Additionally, many of these systems and subsystems have strongly coupled interactions therebetween. Further, multiple systems and subsystems can affect a given parameter. For example, temperature in the combustion chamber may be affected by intake pressure, intake charge air coolers, air heaters, piston cooling, rebreathe mass, coolant temperature, coolant flow, effective compression ratio, and other factors. Each of these factors can influence temperature with an associated gain, response time, and authority range. Many of the aforementioned factors are influenced by multiple control or environmental conditions. For example, intake pressure is influenced by the supercharger clutch state, supercharger drive ratio, supercharger bypass valve position, turbocharger VGT position, intake valve timing, barometric pressure, air filter restriction, heat transfer in first and second charge air coolers 126 and 152, and other factors.

To achieve the desired transient, real time control of a GDCI engine, a system and method have been developed that include determining target values for temperature, pressure and oxygen concentration [$O_2$] of the air charge at a particular time (preferably expressed in terms of crank angle) in the engine cycle preceding initiation of combustion. Oxygen concentration is used as a proxy for exhaust gas diluent fraction. The system and method further include controlling actuators associated with the engine to urge the temperature, pressure, and [$O_2$] of the air charge to the target values. The inventors have determined that controlling the charge air temperature, pressure, and [$O_2$], in conjunction with controlling the timing and fuel quantities of multiple injection events per combustion cycle, provides advantageous control of a GDCI engine. The inventors have further determined that it may be advantageous to structure the controls using a supervisory control that determines high level system control targets and objectives which are then communicated to and achieved by a structure of subsystem controls. This structure allows hardware changes to be made without necessitating control system changes. This structure also provides for easier engine calibration by providing a high level abstraction of control targets rather than individual direct calibrations for each subsystem, allowing interactions to be managed more effectively.

Figure 7A:
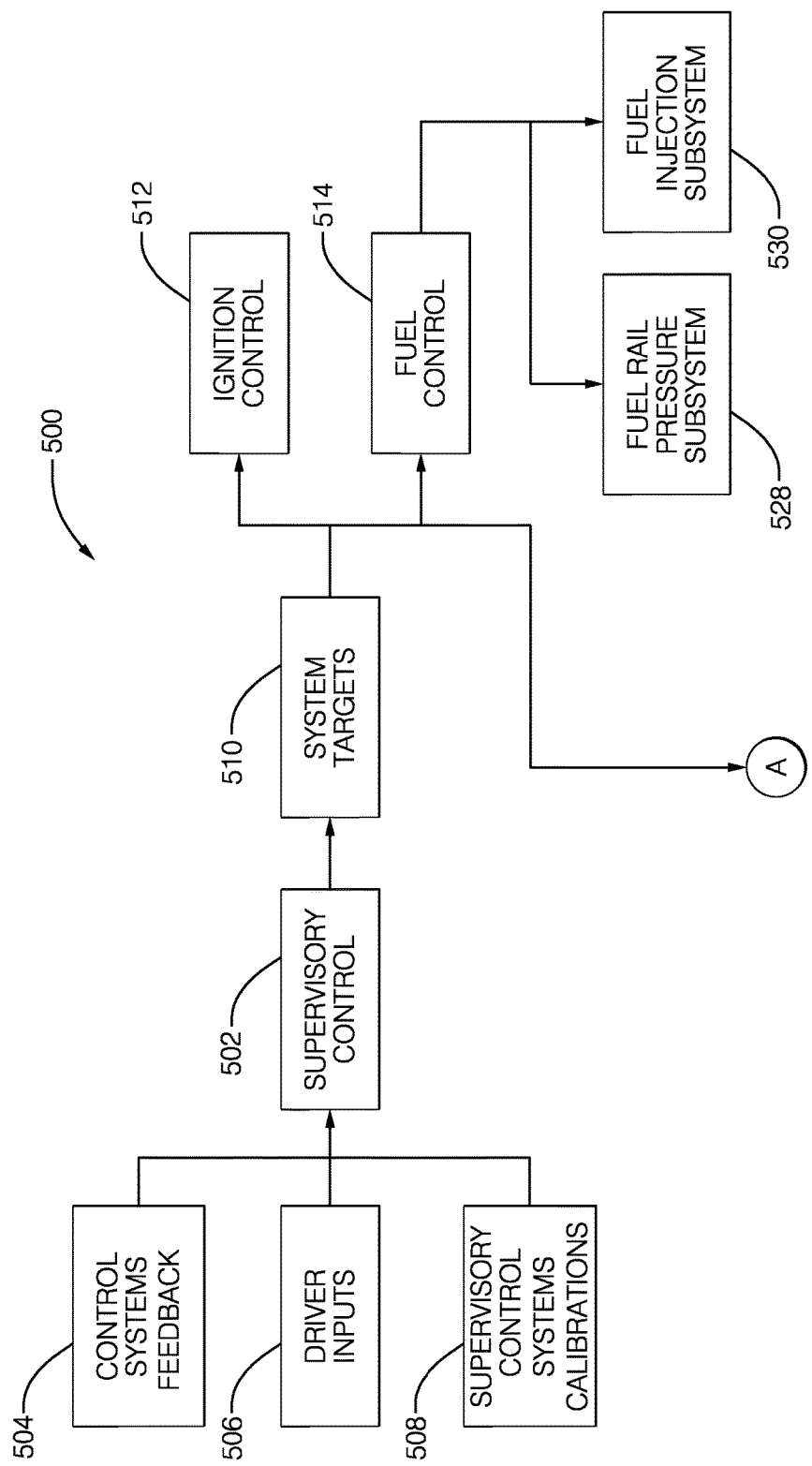
FIGS. 7A, 7B, and 7C are a block diagram of an engine control system architecture incorporating aspects of the present invention.
Figure 7:
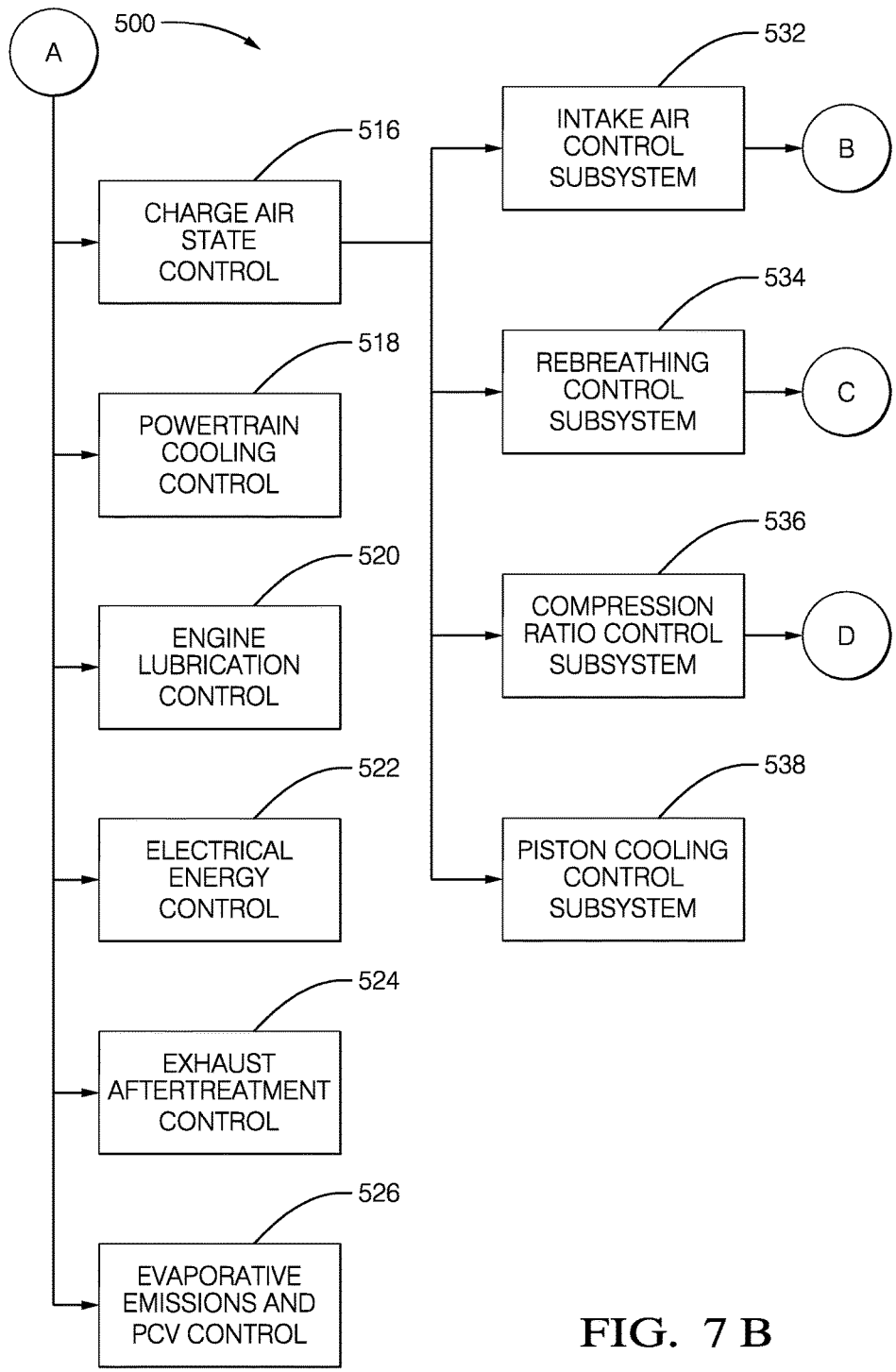
Figure 7:
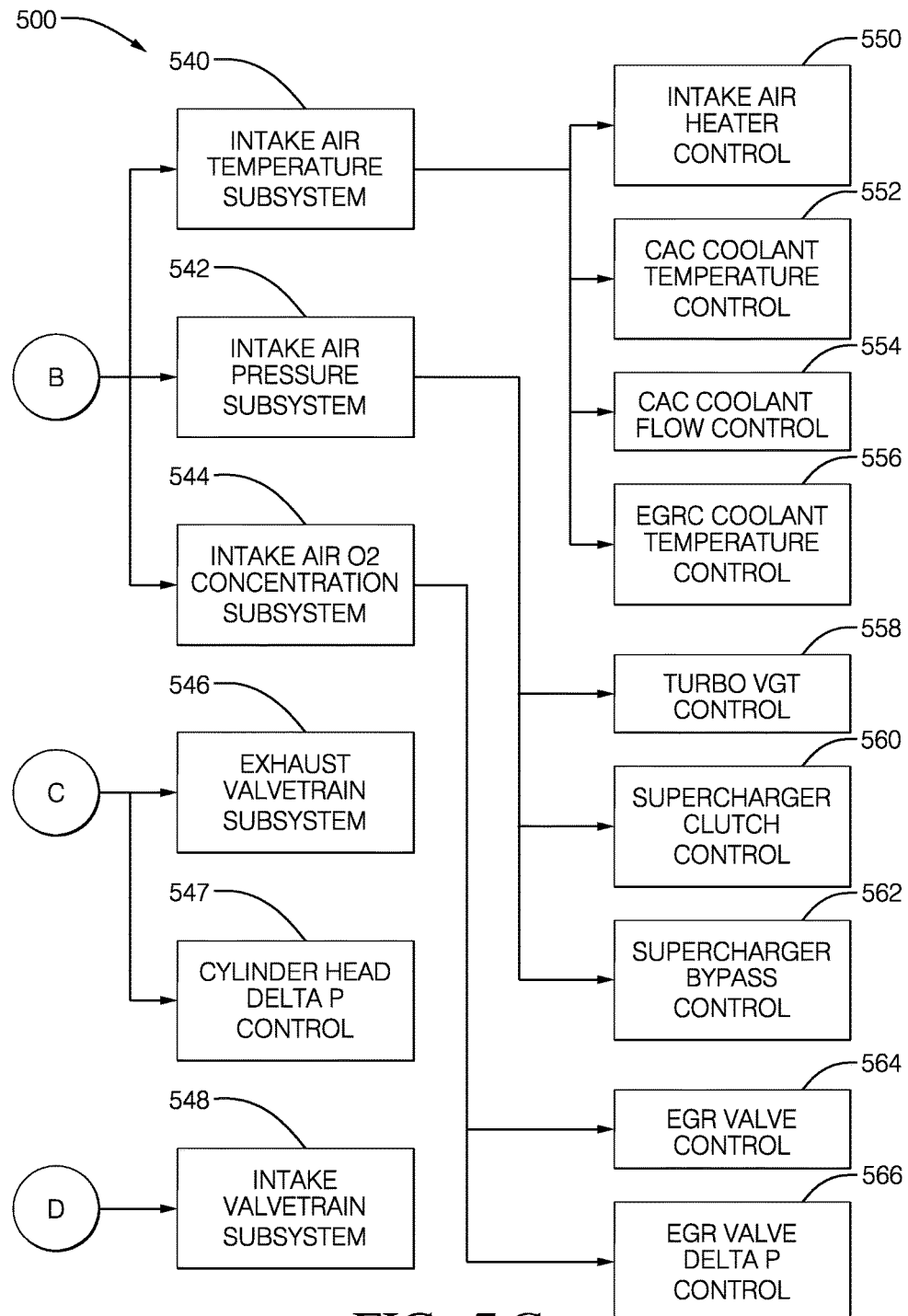

A block diagram of an engine control system architecture 500 incorporating aspects of the present invention is presented in FIGS. 7A, 7B, and 7C. It is to be understood that the block diagram of FIGS. 7A, 7B, and 7C includes a number of circled letters which indicate connections between pages of FIGS. 7A, 7B, and 7C. For example the circled "D" in FIGS. 7B and 7C indicates that the output of the compression ratio control subsystem 536 in FIG. 7B is the input to the intake valvetrain subsystem 548 in FIG. 7C.

As presented in FIGS. 7A, 7B, and 7C, a supervisory controller 502 receives inputs including control systems feedback 504. The control systems feedback 504 includes combustion parameter feedback. The combustion system feedback may include information regarding crank angle corresponding to location of peak pressure (LPP), indicated mean effective pressure (IMEP), pumping mean effective pressure (PMEP), peak angular rate of pressure change (dP/dθ), peak time rate of pressure change (dP/dt), maximum rate of pressure rise (MPRR), crank angle corresponding to 0.5% heat release (CA0.5), crank angle corresponding to 10% heat release (CA10), crank angle corresponding to 50% heat release (CA50), crank angle corresponding to 90% heat release (CA90), the duration in crank-angle degrees between combustion of 10% and 90% of the fuel (CA10-90), the duration in crank-angle degrees between combustion of 0.5% and 50% of the fuel (CA0.5-50), polytropic compression exponent (Kappa), total heat release, peak heat release rate, coefficient of variance of IMEP, peak pressure, and/or estimated combustion noise level associated with a recent combustion event.

The control systems feedback 504 further includes information about actual (measured or estimated) engine states. These may include by way of non-limiting example fuel pressure, estimated charge air state (i.e. pressure, temperature, and oxygen concentration of the air charge in the cylinder at a predetermined crank angle, such as top dead center (TDC) compression), engine coolant temperature, engine coolant flow, lubrication system pressure, estimated lubricant flow, lubricant temperature, electrical system voltage, battery current, alternator duty cycle, exhaust temperature, exhaust pressure, turbocharger boost setting, supercharger clutch position, supercharger bypass valve position, intake manifold absolute pressure (MAP), intake manifold air temperature (MAT), exhaust manifold absolute pressure (EMAP), exhaust manifold air temperature (EMAT), engine speed (RPM), fresh air mass flow (MAF), estimated engine intake air flow, turbocharger compressor outlet pressure, EGR valve differential pressure, EGR valve inlet temperature, exhaust aftertreatment system temperatures and pressures, pressure difference between exhaust and intake (cylinder head delta P), NOx sensor reading, intake wide-range air/fuel ratio sensor reading (IWRAF), and/or exhaust wide-range air/fuel ratio sensor reading (EWRAF).

The supervisory controller 502 also receives driver inputs 506. The driver inputs 506 may include by way of non-limiting example accelerator pedal position, brake pedal position, clutch position, selected gear, and heating-ventilation-air conditioning (HVAC) demand.

A third input to the supervisory controller 502 indicated in FIGS. 7A, 7B, and 7C includes supervisory control system calibrations 508. The control systems calibrations 508 includes target values for combustion parameters, which may include by way of non-limiting example crank angle corresponding to location of peak pressure (LPP), pumping mean effective pressure (PMEP), peak angular rate of pressure change (dP/dθ), peak time rate of pressure change (dP/dt), maximum pressure rise rate (MPRR), crank angle corresponding to 0.5% heat release (CA0.5), crank angle corresponding to 10% heat release (CA10), crank angle corresponding to 50% heat release (CA50), crank angle corresponding to 90% heat release (CA90), the duration in crank-angle degrees between combustion of 10% and 90% of the fuel (CA10-90), the duration in crank-angle degrees between combustion of 0.5% and 50% of the fuel (CA0.5-50), polytropic compression exponent (Kappa), total heat release, peak heat release rate, coefficient of variance of IMEP, peak pressure, and/or estimated combustion noise level.

The control systems calibrations 508 may further include baseline calibration values for baseline fuel injection parameters, which may include by way of non-limiting example number of injections per combustion cycle, percentage of total fuel injected in each of a plurality of injections per combustion cycle, timing of fuel injections, and/or fuel rail pressure. The supervisory controller adaptively uses these calibrations that may be generated from steady-state dynamometer experiments or from on-vehicle or in-application experiments. The supervisory control structure provides for a level of abstraction from the hardware such that changes in hardware or engine design can be accommodated with minimal control structure modification.

Baseline targets for charge air state (i.e. pressure, temperature, and oxygen concentration of the air charge in the cylinder at a predetermined crank angle, such as top dead center (TDC) compression) may also be included in the control systems calibrations 508. Additionally, baseline calibrations for coolant control, lubrication control, electrical system control, exhaust aftertreatment control, and evaporative emissions control may be included in the control systems calibrations 508.

The control systems calibrations 508 may additionally include algorithms and calibrations to actively compensate for combustion errors. The target value of a combustion parameter and the actual value of that combustion parameter received from the feedback block 504 are compared, and appropriate action is taken to mitigate errors between the target and actual values. For example, errors related to the phasing of combustion may be mitigated by modifying fuel injection timing, fuel injection quantity split, and/or charge air state pressure and/or temperature. Errors related to the combustion rate may be mitigated by modifying charge air diluent level (e.g. rebreathe, residuals, and/or EGR) thereby changing the oxygen concentration of the charge air, and/or by modifying the fuel injection quantity split.

The algorithms and calibrations in the supervisory controller 502 are additionally configured to determine and apply compensations prior to each combustion event using modifications to the fuel injection strategy. The air charge properties and pressure-temperature trajectories are fixed at the time of engine valve closure, but since GDCI uses multiple, late injections on the compression stroke and direct fuel injection the fuel injection strategy can be modified after valve closing to optimally match the charge air properties for that combustion event. This is a unique feature of GDCI combustion that is not attainable with HCCI combustion.

The supervisory controller is additionally configured to allow independent control of each cylinder in a multi-cylinder engine using cylinder-specific subsystems. For example, fuel injection control is cylinder specific, and each cylinder can be controlled using a unique fuel injection strategy that can be modified on each combustion event.

The supervisory controller 502 is configured to receive the driver inputs 506, and to calculate target engine operation targets based on the driver inputs 506. These engine operation targets include targets for engine torque and for electrical and thermal states of the engine.

The supervisory controller 502 is further configured to determine desired states for a plurality of systems and to communicate the desired target states to the plurality of systems. The systems for which system targets 510 are determined may include an ignition control system 512, a fuel control system 514, a charge air state control system 516, a powertrain cooling control system 518, an engine lubrication control system 520, an electrical energy control system 522, an exhaust aftertreatment control system 524, and/or an evaporative emissions and PCV control system 526. The desired states are preferably retrieved from a calibration table as a function of engine speed and load, the calibration table being a part of the supervisory control systems calibrations 508 discussed above.

The ignition control system 512 is configured to control an ignition device, e.g. spark plug 76 in FIG. 1, if an ignition device is included in the engine control system 10.

The fuel control system 514 may be configured to control a fuel rail pressure subsystem 528 and a fuel injection subsystem 530. The fuel injection subsystem 530 may be configured to control the amount and the timing of fuel injected in multiple injection events by the fuel injector 30 in FIG. 1.

The charge air state control system 516 may be configured to control a plurality of subsystems whose actions affect charge air temperature, charge air pressure and/or charge air oxygen concentration $[O_2]$. These subsystems may include an intake air control subsystem 532, a rebreathing control subsystem 534, a compression ratio control subsystem 536, and an oil jet control subsystem 538.

The intake air control subsystem 532 may include an intake air temperature subsystem 540 configured to control an intake air heater control subsystem 550 configured to control air heaters as described above relative to FIG. 4. The intake air temperature subsystem 540 may further include a charge air cooler coolant temperature control block 552, a charge air cooler coolant flow control block 554, and/or an EGR cooler coolant temperature control block 556, to control appropriate actuators as described above relative to FIGS. 2 and 3.

The intake air control system 532 may further include an intake air pressure subsystem 542 configured to control a variable geometry turbocharger (VGT) control system 558 configured to control turbocharger 118, a supercharger clutch control system 560 configured to control supercharger clutch 140, and/or a supercharger bypass control system 562 configured to control supercharger bypass valve 142.

The intake air control system 532 may further include an intake air oxygen concentration control system 544 configured to control an EGR valve control system 564 configured to control EGR valve 42 and/or an EGR valve delta P control system 566 configured to control an actuator effective to control the pressure difference across the EGR valve 42.

The rebreathing control subsystem 534 is configured to control an exhaust valvetrain control subsystem 546 configured to control the exhaust valvetrain as described above relative to FIG. 6 and a cylinder head delta P control subsystem 547, which is enabled by way of exhaust manifold pressure control using the turbocharger VGT and/or exhaust backpressure valve control.

The compression ratio control subsystem 536 is configured to control an intake valvetrain control subsystem 548 configured to control the intake valvetrain as described above relative to FIG. 6.

The piston cooling control subsystem 538 is configured to control the oil jets as described above relative to FIG. 5.

The supervisory controller 502 is further configured to compare the desired states for each of the plurality of systems with the actual engine states received by the supervisory controller 502 from the control systems feedback 504. If the result of this comparison indicates that there is an error between the desired state and the actual state for a given system, a target desired state for another system with a faster response time may be modified to compensate for the observed error. As a non-limiting example, if the coolant temperature is lower than the desired coolant temperature at the present engine speed and load, the target value for charge air temperature, charge air pressure, and/or charge air oxygen content [$O_2$] may be modified from its calibrated target value to compensate for the coolant temperature error. Real time control algorithms monitor and adjust system level transient control targets to provide these compensations for each combustion event. In this way, a system with a relatively fast response time may be used to compensate for a slower system (e.g. coolant temperature) being off target.

Further calibrations that may be included in the control systems calibrations 508 include cold start and warm-up calibrations, including open loop controls and strategies to transition from open loop to closed loop control.

Additionally, the control systems calibrations 508 may include calibrations for energy saving algorithms including start/stop operation and electrical and thermal energy management optimization.

In the exemplary system depicted in the block diagram of FIGS. 7A, 7B, and 7C, the supervisory controller 502 is further configured to compare combustion results received from the control systems feedback block 504 to desired combustion parameters retrieved from a calibration table as a function of engine speed and load, the calibration table being a part of the supervisory control systems calibrations 508 discussed above.

Figure 8:
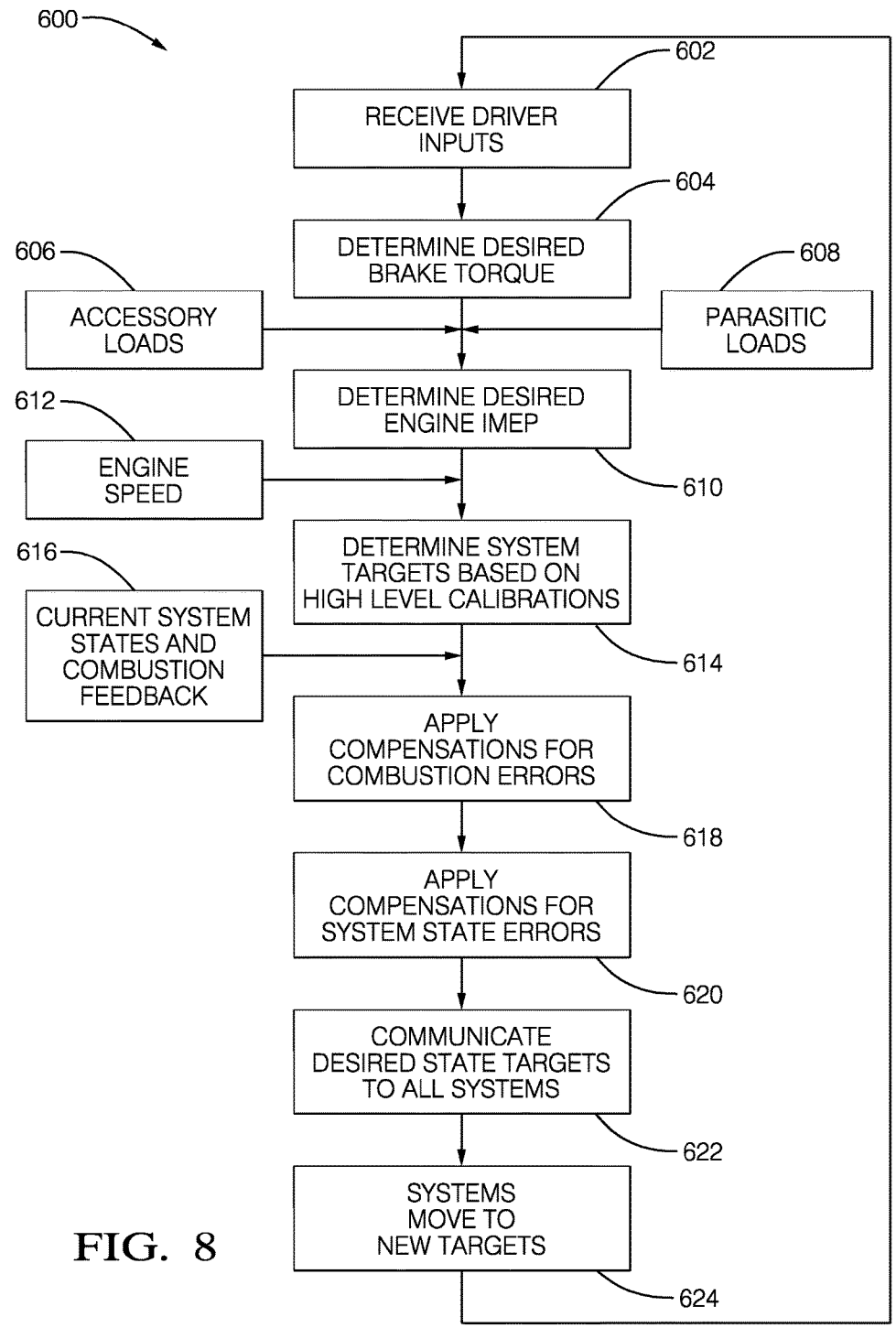
FIG. 8 is a flowchart depicting an algorithm according to an aspect of the invention.

FIG. 8 is a flowchart depicting an exemplary algorithm 600 that may be executed in the practice of the present invention. In step 602 the driver inputs 506 are received. As explained above, the driver inputs 506 may include by way of non-limiting example accelerator pedal position, brake pedal position, clutch position, selected gear, and heater-ventilation-air conditioning (HVAC) demand.

In step 604 of FIG. 8 a desired brake torque is determined based on the driver inputs received in step 602. Step 610 determines desired engine IMEP based on the desired brake torque, taking into account accessory loads 606 (e.g. alternator, air conditioner compressor) and parasitic loads 608 (e.g. friction, supercharger).

With continued reference to FIG. 8, algorithm step 614 determines targets for high level system states based on the desired engine IMEP form step 610, the engine speed 612, and the control system calibrations 508 discussed relative to FIGS. 7A, 7B, and 7C. In steps 618 and 620, the calibration targets determined in step 614 are potentially modified based on current system states and combustion feedback 616 obtained from block 504 in FIGS. 7A, 7B, and 7C.

In block 622, the desired state targets are communicated to the systems under control, e.g. ignition control 512, fuel control 514, charge air state control 516, powertrain cooling control 518, engine lubrication control 520, electrical energy control 522, exhaust aftertreatment control 524, and/or evaporative emissions and PCV control 526.

In block 624 the aforementioned systems under control move to their new target values. The entire process from block 602 through block 624 is repeated on a periodic basis.

While not specifically shown in the block diagram of FIGS. 7A, 7B, and 7C, it is to be understood that the systems under control, e.g. ignition control 512, fuel control 514, charge air state control 516, powertrain cooling control 518, engine lubrication control 520, electrical energy control 522, exhaust aftertreatment control 524, and/or evaporative emissions and PCV control 526, also have information available to them regarding their current states. For example, the powertrain cooling control system 518 has information available about the current coolant temperature as well as information about the current state of valves, pumps, fans, etc. that influence the coolant temperature. Algorithms in the powertrain cooling control system 518 use the information about the current state as well as the target value 510 received from the supervisory controller 502 to determine desired states for the actuators that influence coolant temperature.

In the block diagram of FIGS. 7A, 7B, and 7C there are a number of blocks indicated as performing a control function, namely supervisory control 502, ignition control 512, fuel control 514, charge air state control 516, powertrain cooling control 518, engine lubrication control 520, electrical energy control 522, exhaust aftertreatment control 524, and evaporative emissions and PCV control 526. These control functions are indicated as discrete blocks in FIGS. 7A, 7B, and 7C. However, it will be appreciated that the functions performed by these blocks may be implemented in a single controller, or alternatively the functions may be distributed among a plurality of controllers having appropriate communications therebetween, without departing from the scope of the present invention.

While this invention has been described in terms of preferred embodiments thereof, it is not intended to be so limited, but rather only to the extent set forth in the claims that follow.

We claim:

1. An engine control system comprising a supervisory controller, a fuel control system, and a charge air control system, the supervisory controller configured to:
   receive a set of inputs, said inputs comprising feedback values of one or more combustion parameters, driver inputs, target values for one or more combustion parameters, steady state control targets, and actual engine states;
   determine a target engine indicated torque;
   determine a target charge air pressure, a target charge air temperature, and a target charge air oxygen content based on the target engine torque and engine speed;
   calculate a target compensated charge air pressure, a target compensated charge air temperature, and a target compensated charge air oxygen content based on the received inputs;
   determine target values for one or more fuel control parameters;
   communicate the target fuel control parameters to the fuel control system;
   communicate the target compensated charge air pressure, the target compensated charge air temperature, and the target compensated charge air oxygen content to the charge air control system.

2. The engine control system of claim 1, wherein the target charge air pressure and the target charge air temperature are in reference to a predetermined crank angle position.

3. The engine control system of claim 1, wherein the one or more combustion parameters comprises location of peak pressure (LPP), indicated mean effective pressure (IMEP), pumping mean effective pressure (PMEP), peak angular rate of pressure change (dP/dθ), peak time rate of pressure change (dP/dt), maximum pressure rise rate (MPRR), crank angle corresponding to 0.5% heat release (CA0.5), crank angle corresponding to 10% heat release (CA10), crank angle corresponding to 50% heat release (CA50), crank angle corresponding to 90% heat release (CA90), the duration in crank-angle degrees between combustion of 10% and 90% of the fuel (CA10-90), the duration in crank-angle degrees between combustion of 0.5% and 50% of the fuel (CA0.5-50), polytropic compression exponent (Kappa), total heat release, peak heat release rate, coefficient of variance of IMEP, peak pressure, and/or estimated combustion noise level.

4. The engine control system of claim 1, wherein the combustion parameter target values are provided to the supervisory controller as a predetermined relationship based on engine speed and load.

5. The engine control system of claim 4, wherein the predetermined relationship is stored in one or more look-up tables.

6. The engine control system of claim 1, wherein the target fuel control parameters comprise target values for fuel injection quantity, fuel injection splits, fuel injection timing, and/or fuel rail pressure.

7. The engine control system of claim 1, wherein the supervisory controller is further configured to determine and communicate a target value or state for engine cooling system configuration, exhaust aftertreatment system configuration, evaporative emissions system configuration, and/or default control actions for subsystems for fail safe operation.

8. The engine control system of claim 1, wherein the actual engine states input comprises measured or estimated values of manifold absolute pressure (MAP), manifold air temperature (MAT), exhaust manifold absolute pressure (EMAP), exhaust manifold air temperature (EMAT), engine speed (RPM), coolant temperature, intake wide-range air/fuel ratio sensor reading (IWRAF), and/or exhaust wide-range air/fuel ratio sensor reading (EWRAF).

9. The engine control system of claim 1, wherein compensations to control targets are made based on predictive models of combustion process response to input engine states.

10. The engine control system of claim 1, further comprising thermal energy management algorithms for conservation of thermal energy and movement of thermal energy between subsystems.

11. The engine control system of claim 1, wherein combustion in each cylinder is controlled independently using cylinder-specific controls.

12. The engine control system of claim 1, wherein the supervisory control system manages the combustion process for an internal combustion engine.

13. A method of controlling an engine system comprising a supervisory controller and a plurality of engine control subsystems, the method comprising the steps of:
receiving, in the supervisory controller, data relating to desired torque;
receiving, in the supervisory controller, data relating to engine speed;
determining, in the supervisory controller, targets for a combustion parameter and for a plurality of system states, said targets being determined based on the desired torque and the engine speed;
receiving, in the supervisory controller, data relating to current values of the plurality of system states;
receiving, in the supervisory controller, data relating to a recent value of the combustion parameter;
establishing, in the supervisory controller, a target compensated charge air pressure, a target compensated charge air temperature, and a target compensated charge air oxygen content;
communicating the target compensated charge air pressure, the target compensated charge air temperature, and the target compensated charge air oxygen content from the supervisory controller to the engine control subsystems.

* * * * *